United States Patent
Kameyama et al.

(10) Patent No.: US 6,505,508 B1
(45) Date of Patent: Jan. 14, 2003

(54) APPARATUS FOR DETECTING TURBULENT LAYER

(75) Inventors: Shumpei Kameyama, Tokyo (JP); Yoshihito Hirano, Tokyo (JP); Shusou Wadaka, Tokyo (JP); Hidetoshi Tanaka, Tokyo (JP); Wakasa Kise, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/831,739

(22) PCT Filed: Apr. 18, 2000

(86) PCT No.: PCT/JP00/02526

§ 371 (c)(1),
(2), (4) Date: May 14, 2001

(87) PCT Pub. No.: WO01/38904

PCT Pub. Date: May 31, 2001

(30) Foreign Application Priority Data

Nov. 22, 1999 (JP) .......................... 11-331583

(51) Int. Cl.$^7$ ............................... G01M 9/00
(52) U.S. Cl. ........................................ 73/147
(58) Field of Search .................. 73/178 R, 170.11, 73/147, 705, 170.13; 250/231.19; 356/5, 28.5, 342

(56) References Cited

U.S. PATENT DOCUMENTS 4,652,122 A    3/1987  Zincone et al. ............ 356/28.5
5,117,689 A    6/1992  Gary ........................ 73/178 R

FOREIGN PATENT DOCUMENTS

| JP | 623665   | 1/1987  |
| JP | 6342084  | 12/1994 |
| JP | 2779563  | 5/1998  |
| JP | 2895249  | 3/1999  |

OTHER PUBLICATIONS

American Institute of Aeronautics and Astronautics, vol. 84, No. 270, (USA) American Institute of Aeronautics and Astronautics, New York (Jan. 9, 1984) pp 1–8.

Primary Examiner—William Oen
(74) Attorney, Agent, or Firm—Birch, Stewart, Kolasch & Birch, LLP.

(57) ABSTRACT

A turbulent layer detecting apparatus in accordance with the present invention is equipped with a transmitting section that transmits beams of electromagnetic waves, sound waves or light waves into the atmosphere, a receiving section that receives the electromagnetic waves, the sound waves, or the light waves that have been transmitted by the transmitting section and scattered by particulates or the like in the atmosphere, a wind velocity measuring section that measures a beam direction component of a wind velocity at two or more observation points on a beam from a received signal received by the receiving section, or a density measuring section that measures a density at two or more observation points on the beam, and a turbulent layer detecting section that detects the presence of a turbulent layer on the basis of the output of either the wind velocity measuring section or the density measuring section.

20 Claims, 8 Drawing Sheets

APPARATUS FOR DETECTING TURBULENT LAYER

This application is the national phase under 35 U.S.C. §371 of PCT International Application No. PCT/JP00/02526 which has an International filing date of Apr. 18, 2000, which designated the United States of America and was not published in English.

TECHNICAL FIELD

The present invention relates to detection of the presence of a turbulent layer from wind velocity and density at an observation point in the atmosphere and, more particularly, to a turbulent layer detecting apparatus for detecting a turbulent layer from the wind velocity and density at two or more observation points in the atmosphere.

BACKGROUND ART

Hitherto, as this type of a turbulent layer detecting apparatus, there has been known the one disclosed in the publication of U.S. Pat. No. 5,117,689, in which the heat radiated by molecules in the atmosphere is received by a passive sensor to measure the altitude distribution of temperatures and potential temperatures, and to further measure the wind velocity distribution in the atmosphere. Based on the measurement results of the altitude distribution of the temperatures and the potential temperatures and the wind velocity distribution, the Richardson number, which is an index indicating the degree of the turbulence of the atmospheric layer, is calculated thereby to detect a turbulent layer.

However, in the apparatus using the method described above, it has been extremely difficult to perform the measurement of wind velocity and the measurement of temperatures and potential temperatures from the same received signal, so that at least two different transmitting and receiving sections have been necessary. This has been posing a problem in that the apparatus is inevitably expensive.

Furthermore, it is required to determine the distribution of the Richardson numbers in the atmosphere over numerous points in the atmosphere, presenting a problem in that a considerable amount of time is required for detecting a turbulent layer.

The present invention has been made in view of the above, and it is an object of the invention to provide a turbulent layer detecting apparatus that transmits the beams of electromagnetic waves, sound waves, or light waves into the atmosphere, receives the electromagnetic waves, sound waves, or light waves that have been scattered by particulates or the like at a plurality of observation points in the atmosphere, measures both wind velocities and densities at the plurality of observation points in the atmosphere on the basis of the received signals, and detects the presence of a turbulent layer in an atmospheric layer sandwiched between the plurality of observation points from the measurement results of the wind velocities and the densities, thus making the detecting apparatus less expensive and also allowing a shortened time required for detection to be achieved.

DISCLOSURE OF INVENTION

A turbulent layer detecting apparatus in accordance with the present invention is equipped with a transmitting section that transmits beams of electromagnetic waves, sound waves or light waves into the atmosphere, a receiving section that receives the electromagnetic waves, the sound waves, or the light waves that have been transmitted by the transmitting section and scattered by particulates or the like in the atmosphere, a wind velocity measuring section that measures a beam direction component of a wind velocity at two or more observation points on a beam from a received signal received by a receiving section, or a density measuring section that measures a density at two or more observation points on the beam, and a turbulent layer detecting section that detects the presence of a turbulent layer on the basis of the output of either the wind velocity measuring section or the density measuring section.

The wind velocity measuring section determines the wind velocity in a horizontal direction from the beam direction component of the wind velocity.

The difference in altitude between two adjacent observation points of two or more observation points is greater than the thickness of the turbulent layer to be detected.

The turbulent layer detecting section detects a horizontal wind velocity difference from the horizontal wind velocities at two adjoining observation points of two or more observation points on a beam so as to detect a turbulent layer from the size of the horizontal wind velocity difference, or measures the densities at two adjoining observation points at two or more observation points on the beam and measures the change rate in the density at the altitudes of the two adjoining observation points so as to detect a turbulent layer from the level of the change rate in the density.

The turbulent layer detecting section has a predetermined threshold value on the horizontal wind velocity difference, and determines that a turbulent layer exists if a horizontal wind velocity difference exceeds the threshold value.

The turbulent layer detecting section has a predetermined threshold value on the Richardson number, estimates a change rate in density from a known atmospheric density distribution, uses the estimated change rate in density and a measured horizontal wind velocity difference to calculate the Richardson number, and determines that a turbulent layer exists if the calculated Richardson number is smaller than the predetermined threshold value on the Richardson number.

The turbulent layer detecting section has a predetermined threshold value on the change rate in density, and determines that a turbulent layer exists if a measurement of the change rate in density is smaller than the threshold value.

The turbulent layer detecting section has a predetermined threshold value on the Richardson number, estimates a horizontal wind velocity difference from a known atmospheric wind velocity distribution, uses the estimated horizontal wind velocity difference and a measured change rate in density to calculate the Richardson number, and determines that a turbulent layer exists if the calculated Richardson number is smaller than the predetermined threshold value on the Richardson number.

The turbulent layer detecting section has a predetermined threshold value on the horizontal wind velocity difference and a predetermined threshold value on the change rate in density, and determines that a turbulent layer exists if at least one of the following conditions is satisfied, the conditions being such that a measurement of the horizontal wind velocity difference exceeds the predetermined threshold value on the horizontal wind velocity difference, and a measurement of the change rate in density is smaller than the predetermined threshold value on the change rate in density.

The turbulent layer detecting section has a predetermined threshold value on the Richardson number, uses a measurement of the horizontal wind velocity difference and a measurement of the change rate in density to calculate the Richardson number, and determines that a turbulent layer exists if the calculated Richardson number is smaller than the predetermined threshold value on the Richardson number.

The turbulent layer detecting section uses a measurement result of either the change rate in density or the horizontal wind velocity difference to detect a turbulent layer, and if it determines that a turbulent layer has been detected, then it verifies the presence of the turbulent layer by employing the other measurement result.

The transmitting section sequentially scans the direction of beams in the atmosphere, and the receiving section receives the scanned beams that have been scattered by particulates or the like in the atmosphere.

The wind velocity measuring section measures the beam direction component of the wind velocity at two or more observation points on the beam, and the density measuring section measures the density at two or more observation points on the beam at each point in the process of scanning the direction of the beam.

The wind velocity measuring section determines the horizontal wind velocity from the beam direction component of the wind velocity at each point in the process of scanning the direction of the beam.

The altitude difference of two adjoining observation points of two or more observation points is greater than the thickness of a turbulent layer to be detected.

The turbulent layer detecting section detects the horizontal wind velocity difference between the upper and lower layers of an atmospheric layer at respective portions of the atmospheric layer from the horizontal wind velocities at the observation points on a beam at each point in the process of scanning the direction of the beam, and detects the presence of a turbulent layer in each portion of the atmospheric layer from the magnitude of the horizontal wind velocity difference, or measures the densities at the observation points on the beam at each point in the direction of the beam in the process of scanning the beam, and measures the change rate in density in each portion of the atmospheric layer so as to detect the presence of a turbulent layer in each portion of the atmospheric layer from the level of the measured change rate in density.

The turbulent layer detecting section has a predetermined threshold value on the horizontal wind velocity difference, and determines that a turbulent layer exists if a horizontal wind velocity difference exceeds the threshold value.

The turbulent layer detecting section has a predetermined threshold value on the Richardson number, estimates a change rate in density from a known atmospheric density distribution, uses the estimated change rate in density and a measured horizontal wind velocity difference to calculate the Richardson number, and determines that a turbulent layer exists if the calculated Richardson number is smaller than the predetermined threshold value on the Richardson number.

The turbulent layer detecting section has a predetermined threshold value on the change rate in density, and determines that a turbulent layer exists if a measurement of the change rate in density in each portion of the atmospheric layer is smaller than the threshold value.

The turbulent layer detecting section has a predetermined threshold value on the Richardson number, estimates a horizontal wind velocity difference from a known atmospheric wind velocity distribution, uses the estimated horizontal wind velocity difference and a measured change rate in density to calculate the Richardson number, and determines that a turbulent layer exists if the calculated Richardson number is smaller than the predetermined threshold value on the Richardson number.

The turbulent layer detecting section has a predetermined threshold value on the horizontal wind velocity difference and a predetermined threshold value on the change rate in density, and determines that a turbulent layer exists if at least one of the following conditions is satisfied, the conditions being such that, in each portion of the atmospheric layer, the horizontal wind velocity difference at observation points located in the upper and lower layers of the atmospheric layer exceeds the predetermined threshold value on the horizontal wind velocity difference, and a measurement of the change rate in density at the observation points located in the upper and lower layers of the atmospheric layer is smaller than the predetermined threshold value on the change rate in density.

The turbulent layer detecting section has a predetermined threshold value on the Richardson number, uses a measurement of the horizontal wind velocity difference and a measurement of the change rate in density at the observation points located in the upper and lower layers of the atmospheric layer in each portion of the atmospheric layer to calculate the Richardson number, and determines that a turbulent layer exists if the calculated Richardson number is smaller than the predetermined threshold value on the Richardson number.

The turbulent layer detecting section performs the detection of a turbulent layer by employing the measurement result of either the change rate in density or the horizontal wind velocity difference between the upper and lower layers sandwiching the atmospheric layer. If the turbulent layer detecting section determines that a turbulent layer has been detected, then it verifies the presence of the turbulent layer by employing the other measurement result.

The transmitting section has a function for transmitting two or more beams of electromagnetic waves, sound waves, or light waves, and the receiving section receives electromagnetic waves, sound waves, or light waves generated by being scattered by particulates or the like in the atmosphere.

The wind velocity measuring section measures the beam direction component of wind velocity at observation points on each of two or more beams, and the density measuring section measures the density at observation points on each of two or more beams.

The wind velocity measuring section determines the horizontal wind velocity from a beam direction component of a wind velocity at the observation points on two or more beams.

The positions of at least two observation points among the respective observation points on two or more beams are the two locations in a direction perpendicular to the surface of the earth.

The distance between the two locations in the direction perpendicular to the surface of the earth is greater than the thickness of a turbulent layer to be detected.

The turbulent layer detecting section detects a horizontal wind velocity difference between the upper and lower layers of an atmospheric layer in each portion of the atmospheric layer from the horizontal wind velocity at an observation point on each of two or more beams, and detects the presence of a turbulent layer in each portion of the atmospheric layer from the magnitude of the horizontal wind velocity difference, or measures the density at an observation point on each of two or more beams, and measures the change rate in density in each portion of the atmospheric layer so as to detect the presence of a turbulent layer in each portion of the atmospheric layer from the level of the measured change rate in density.

The turbulent layer detecting section has a predetermined threshold value on the horizontal wind velocity difference, and determines that a turbulent layer exists if a horizontal wind velocity difference exceeds the threshold value.

The turbulent layer detecting section has a predetermined threshold value on the Richardson number, estimates a change rate in density from a known atmospheric density distribution, uses the estimated change rate in density and a measured horizontal wind velocity difference to calculate the Richardson number, and determines that a turbulent layer exists if the calculated Richardson number is smaller than the predetermined threshold value on the Richardson number.

The turbulent layer detecting section has a predetermined threshold value on the change rate in density, and determines that a turbulent layer exists if a measurement of the change rate in density is smaller than the threshold value.

The turbulent layer detecting section has a predetermined threshold value on the Richardson number, estimates a horizontal wind velocity difference from a known atmospheric wind velocity distribution, uses the estimated horizontal wind velocity difference and a measured change rate in density to calculate the Richardson number, and determines that a turbulent layer exists if the calculated Richardson number is smaller than the predetermined threshold value on the Richardson number.

The turbulent layer detecting section has a predetermined threshold value on the horizontal wind velocity difference and a predetermined threshold value on the change rate in density, and determines that a turbulent layer exists if at least one of the following conditions is satisfied, the conditions being such that, in each portion of the atmospheric layer, the horizontal wind velocity difference at observation points located in the upper and lower layers of the atmospheric layer exceeds the predetermined threshold value on the horizontal wind velocity difference, and a measurement of the change rate in density at the observation points located in the upper and lower layers of the atmospheric layer is smaller than the predetermined threshold value on the change rate in density.

The turbulent layer detecting section has a predetermined threshold value on the Richardson number, uses a measurement of the horizontal wind velocity difference and a measurement of the change rate in density at the observation points located in the upper and lower layers of the atmospheric layer in each portion of the atmospheric layer to calculate the Richardson number, and determines that a turbulent layer exists if the calculated Richardson number is smaller than the predetermined threshold value on the Richardson number.

The turbulent layer detecting section performs the detection of a turbulent layer by employing the measurement result of either the change rate in density or the horizontal wind velocity difference between the upper and lower layers sandwiching the atmospheric layer. If the turbulent layer detecting section determines that a turbulent layer has been detected, then it verifies the presence of the turbulent layer by employing the other measurement result.

The predetermined threshold value on the Richardson number is 0.25.

BEST MODE FOR CARRYING OUT THE INVENTION

EXAMPLE 1

Figure 1:
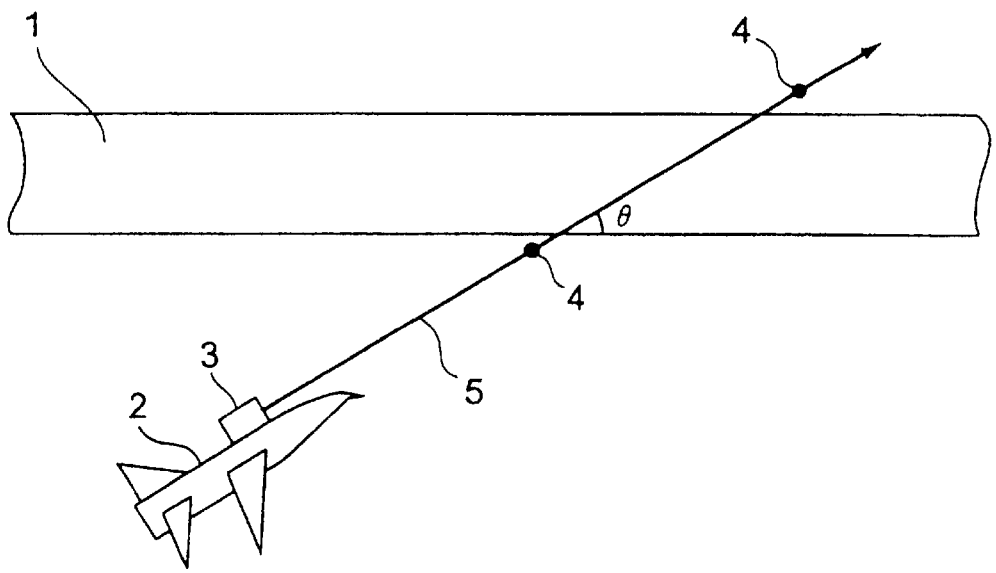
FIG. 1 is a schematic representation illustrating a turbulent layer detecting apparatus according to Example 1 of the present invention.

A turbulent layer detecting apparatus according to Example 1 of the present invention will be described with reference to FIG. 1 through FIG. 4. FIG. 1 is a schematic representation illustrating the turbulent layer detecting apparatus according to Example 1 of the present invention. In FIG. 1, reference numeral 1 denotes an atmospheric layer wherein the presence of a turbulent layer is detected, reference numeral 2 denotes an aircraft, reference numeral 3 denotes a turbulent layer detecting apparatus mounted on the aircraft 2, reference numeral 4 denotes observation points, and reference numeral 5 denotes a beam of electromagnetic wave, sound wave, or light wave transmitted by the turbulent layer detecting apparatus 3.

In FIG. 1, the atmospheric layer 1 lies horizontally to the surface of the earth. The observation points 4 are present at two locations on the beam 5. The upper and lower layers sandwiching the atmospheric layer 1 exist horizontally to the surface of the earth. It is assumed that the wind velocity, density, etc. are substantially constant in each layer of the upper and lower layers sandwiching the turbulent layer.

Figure 2:
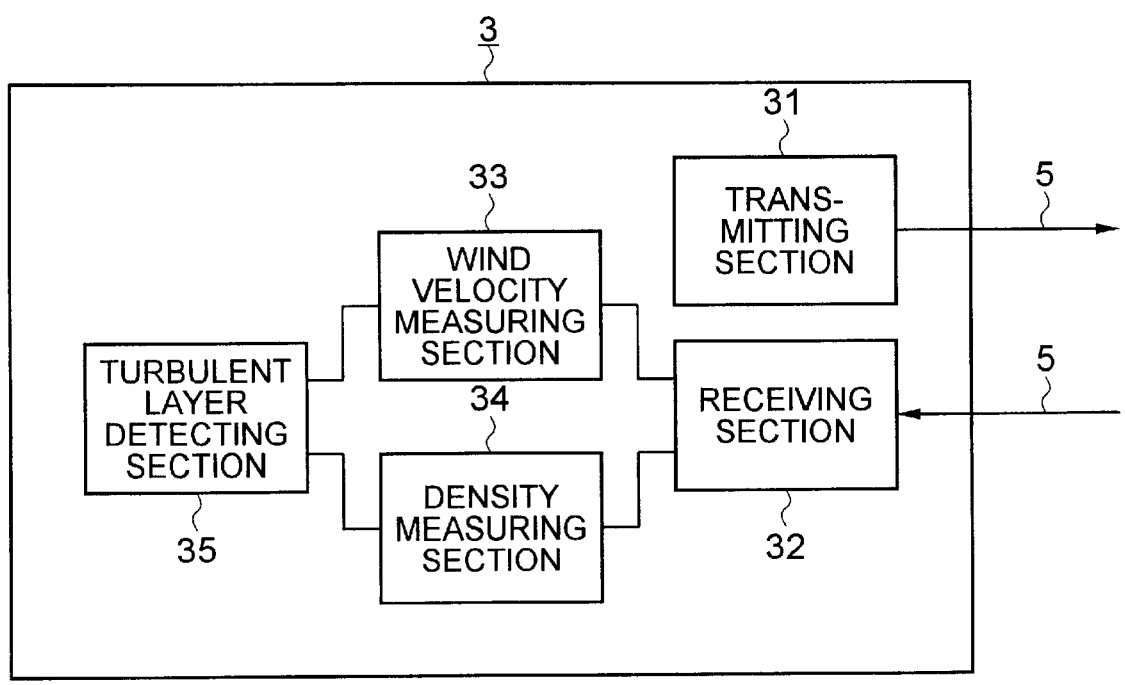
FIG. 2 is a block diagram showing a construction of the turbulent layer detecting apparatus shown in FIG. 1.

FIG. 2 is a block diagram showing the construction of the turbulent layer detecting apparatus 3 shown in FIG. 1. In FIG. 2, reference numeral 31 denotes a transmitting section that transmits the beam 5 of electromagnetic wave, sound wave, or light wave into the atmosphere. Reference numeral 32 denotes a receiving section that receives the electromagnetic wave, sound wave, or light wave that has been transmitted by the transmitting section 31 and scattered by particulates or the like in the atmosphere. Reference numeral 33 denotes a wind velocity measuring section for measuring the beam direction component of a wind velocity at two or more observation points on the beam 5 from a received signal received by the receiving section 32. Reference numeral 34 designates a density measuring section for measuring density at two or more observation points on the beam 5 from a received signal received by the receiving section 32. Reference numeral 35 designates a turbulent layer detection section for detecting the presence of a turbulent layer on the basis of an output of either the wind velocity measuring section 33 or the density measuring section 34.

The turbulent layer to be detected in the present invention is generated from all or a part of the atmospheric layer 1 caused by turbulence taking place in the atmospheric layer 1. The generation of the turbulent layer will now be described in conjunction with FIG. 3.

Figure 3:
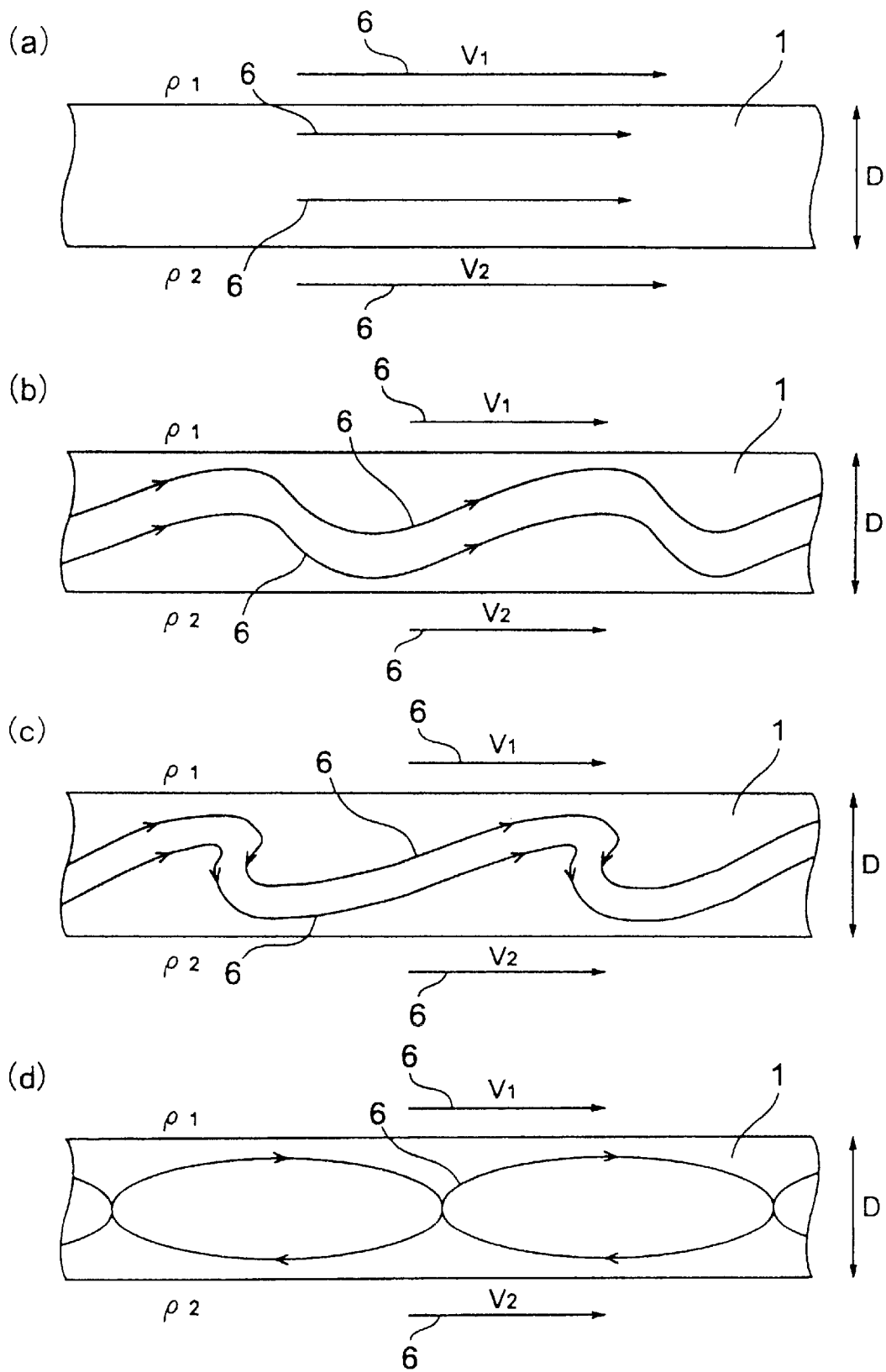
FIG. 3 is a diagram illustrating a process of the generation of a turbulent layer.
Figure 4:
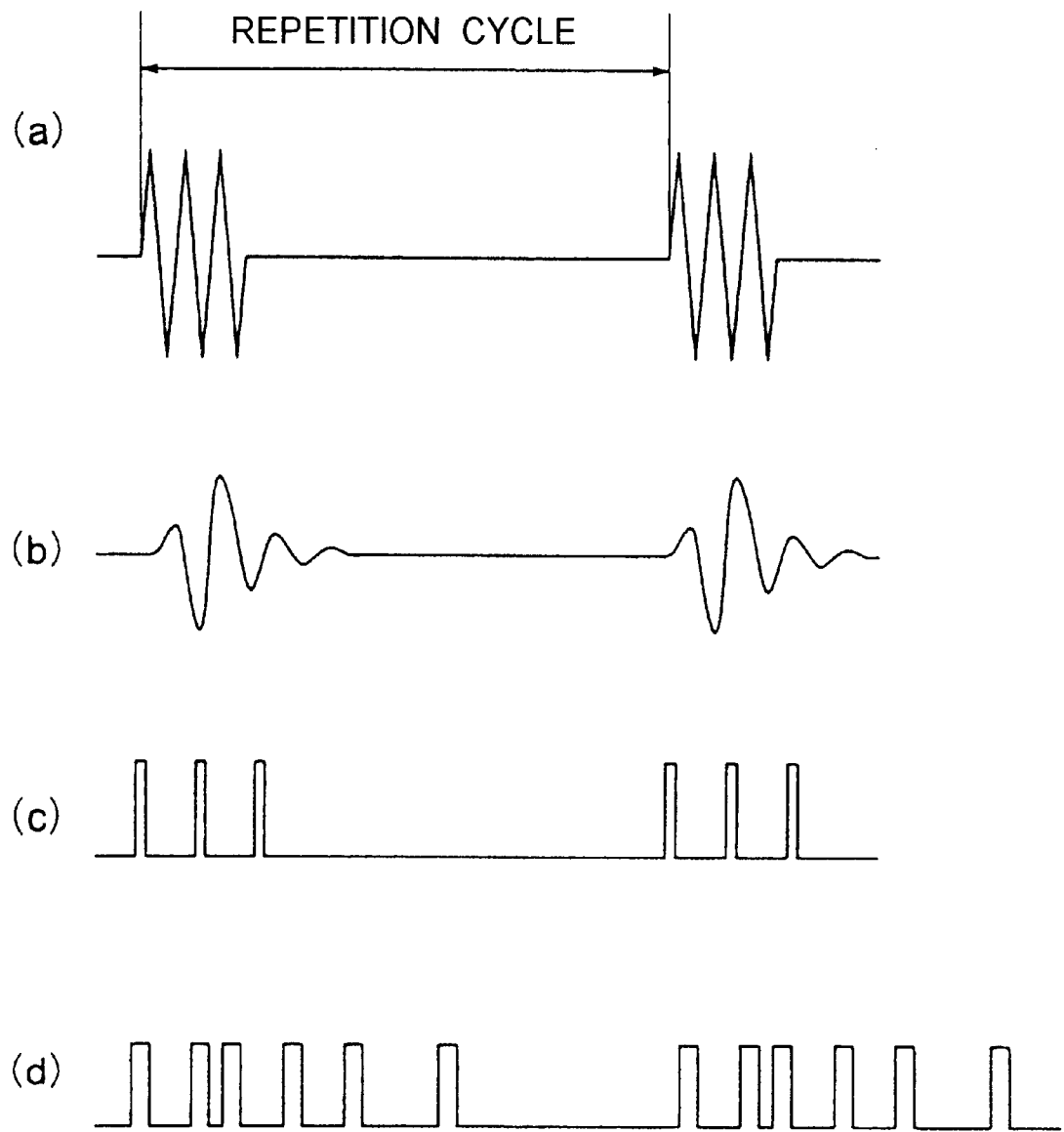
FIG. 4 is a waveform diagram showing the waveforms of transmitted signals sent by a transmitter.

FIG. 3 is a diagram illustrating the process of the generation of a turbulent layer. In FIG. 3, reference numeral 6 designates a wind direction. The turbulent layer is generated through the process shown in (a) through (d) of FIG. 3 if there is a difference in wind velocity in horizontal wind velocity between upper and lower atmospheric layers sandwiching the atmospheric layer 1. In FIG. 3, $V_1$ denotes the horizontal wind velocity of a layer in contact with the upper side of the atmospheric layer 1, $V_2$ denotes the horizontal wind velocity of a layer in contact with the lower side of the atmospheric layer 1, and D denotes the thickness of the atmospheric layer. The density in the layer in contact with the upper side of the atmospheric layer 1 is designated by $\rho_1$, and the density in the layer in contact with the lower side of the atmospheric layer 1 is designated by $\rho_2$.

The degree of the turbulence of an airstream in the atmospheric layer 1 can be represented by the magnitude of Richardson number $R_i$ indicated by expression (1), which will be shown hereinafter, by the change rate in density represented by $(\rho_1-\rho_2)/\{(\rho_1+\rho_2)/2\}$, thickness D of the atmospheric layer 1, difference in horizontal wind velocity $V_c$ (=$V_1-V_2$) between the upper and lower layers of the atmospheric layer 1, and gravity g. A larger Richardson number means less turbulence in an airstream, while a smaller Richardson number means more turbulence in an airstream. As can be understood from expression 1, Richardson number $R_i$ decreases, that is, the degree of the turbulence in an airstream increases, as the difference in horizontal wind velocity between the upper and lower layers of the atmospheric layer 1 increases and the change rate in density decreases.

The condition for a turbulent layer wherein a vortex air turbulence exists, which poses a problem especially in the operation of an aircraft is represented by Richardson number $R_i$<0.25 according to literature [1] (written by E. K. Parks, et al., "Identification of vortex induced clear air turbulence using airline flight records.", Papers. American Institute of Aeronautics and Astronautics, pp.1–8, 1984.).

The term "turbulent layer" in the present invention has at least one, or two or more meanings of the followings: it means an atmospheric layer in which the foregoing difference in horizontal wind velocity in the layers in contact with the top and bottom of the turbulent layer is larger than a certain threshold value, an atmospheric layer in which the foregoing change rate in density determined from the densities in the layers in contact with the top and bottom of the turbulence layer is smaller than a certain threshold value, and Richardson number $R_i$ determined on the basis of the foregoing horizontal difference in wind velocity between the layers in contact with the turbulent layer and the foregoing change rate in density and the thickness of the layer is smaller than a certain threshold value.

The generation of the turbulent layer has been described. The turbulent layer detecting apparatus will now be described. As shown in FIG. 1, the turbulent layer detecting apparatus 3 is mounted on the aircraft 2. And, the turbulent layer detecting apparatus 3 is equipped with the transmitting section 31 for transmitting the beam 5 of electromagnetic wave, sound wave, or light wave into the atmosphere, and the receiving section 32 that receives the electromagnetic wave, sound wave, or light wave that has been generated by the beam being scattered by particulates or the like in the atmosphere, as shown in FIG. 2. The transmitting section 31 and the receiving section 32 may be the same section that performs both transmitting and receiving, or they may be separate sections.

As shown in FIGS. 4(a) and (d), the transmitted signal used in the present invention is repeatedly produced at a predetermined repetition cycle. This signal may be the signal having a predetermined carrier frequency, as shown in FIG. 4(a), an oscillatory waveform having a limited lasting time, as shown in FIG. 4(b), or a signal formed of the waveform of a single or a plurality of DC sub-pulses, as shown in FIG. 4(c). Alternatively, the signal may be the one formed of the waveform that has been subjected to pseudo-random modulation, as shown in FIG. 4(d).

The wind velocity measuring section 33 measures, from the received signal received by the receiving section 32, the beam direction components of wind velocities at the two observation points 4 on the beam 5. The density measuring section 34 measures densities at the two observation points 4 on the beam 5.

Functionally, it is not always necessary to provide the turbulent layer detecting apparatus 3 with both the wind velocity measuring section 33 and the density measuring section 34, and the apparatus 3 is able to detect a turbulent layer if it is equipped with at least one of the two measuring sections.

The measurement of the beam direction component of a wind velocity by the wind velocity measuring section 33 can be performed by detecting the Doppler shift of the received signal. The measurement of the density by the density measuring section 34 can be performed by measuring the intensity of the received signal.

This enables the measurement of the wind velocities and the densities of the upper and lower layers sandwiching a turbulent layer rather than directly measuring the wind velocity in the turbulent layer. The wind velocities and the densities of the upper and lower layers sandwiching the turbulent layer are stable in comparison with the wind velocity and the density in the turbulent layer. Hence, the error in measuring the wind velocity and the density can be reduced. This permits higher accuracy in the detection of a turbulent layer.

The wind velocity measuring section 33 determines horizontal wind velocity $V_h$ at the two observation points 4 on the beam 5 according to expression (2), which will be shown hereinafter, where θ designates the angle formed by the direction of the beam 5 and the direction of the atmospheric layer 1, and Vb designates the wind velocity in the beam direction. Thus, it is possible to measure the horizontal component $V_h$ of the wind velocities of the upper and lower layers sandwiching the atmospheric layer 1. Using the horizontal wind velocities enable the detection of the presence of a turbulent layer by, for example, the Richardson number mentioned above.

The altitude difference between the two observation points 4 is set so that it is greater than the thickness of the turbulent layer that need to be detected. More specifically, distance L between the observation points 4 is decided according to expression (3), which will be shown hereinafter, wherein the thickness of the turbulent layer to be detected is denoted by D', and the angle formed by the direction of the beam 5 and the direction of the atmospheric layer 1 is designated by θ.

Deciding the distance between the observation points 4 makes it possible to prevent both two adjacent observation points 4 from lying in the turbulent layer, the thickness of which need to be detected. Thus, it is possible to increase the probability of disposing the two adjacent observation points in the upper and lower layers of the turbulent layer, the thickness of which need to be detected.

The turbulent layer detecting section 35 detects horizontal wind velocity difference $V_c$ from horizontal wind velocity $V_h$ at the two observation points 4 on the beams 5, and detects the turbulent layer from the magnitude of horizontal wind velocity difference $V_c$. The turbulent layer detecting section 35 measures the density at the two observation points 4 on the beam 5, measures change rate $\rho_c$ of the density at the altitudes of the two observation points according to expression (4), which will be shown hereinafter, where the density measured at the observation point at a higher altitude out of the two observation points 4 is denoted as $\rho'_1$, and the density measured at the observation point at a lower altitude out of the two observation points 4 is denoted as $\rho'_2$, and the altitude difference between the two observation points 4 is denoted as D" (=Lsinθ), and detects a turbulent layer from the magnitude of the measured change rate $\rho_c$ of density.

As can be understood from the relationship between the aforesaid Richardson number and the presence of a turbulent layer, horizontal wind velocity difference $V_c$ and change rate $\rho_c$ of density provide indexes in detecting a turbulent layer. Therefore, the presence of a turbulent layer can be detected with high accuracy by measuring horizontal wind velocity difference $V_c$ and change rate $\rho_c$ of density.

To detect a turbulent layer from the magnitude of horizontal wind velocity difference $V_c$, a method may be used in which a threshold value on horizontal wind velocity difference $V_c$ is decided in advance, and it is determined that a turbulent layer exists if a measurement of horizontal wind velocity difference $V_c$ exceeds the above threshold value. This makes it possible to reliably detect a turbulent layer having a horizontal wind velocity difference that exceeds the threshold value.

Another method may be used in which the threshold value on the above Richardson number $R_i$ is decided in advance, and change rate $\rho_c$ of density is estimated from a generally known atmospheric density distribution, as shown in, for example, literature [2] (Scientific chronology (Year 1997 edition), p.383, edited by National Observatory, published by Maruzen). The estimated value and a measured wind velocity difference $V_c$ are used, and thickness D of an atmospheric layer is substituted by altitude difference D" between the two observation points 4 in expression (1) to calculate Richardson numbers $R_i$ at the altitudes of the two observation points 4. The calculation result is compared with the above threshold value so as to determine the presence of a turbulent layer. This permits further improved accuracy of the detection of a turbulent layer to be achieved since the presence of a turbulent layer is detected on the basis of the values of both horizontal wind velocity difference $V_c$ and change rate $\rho_c$ of density.

To detect a turbulent layer from the magnitude of change rate $\rho_c$ of density, a method may be used in which the threshold value on change rate $\rho_c$ of density is decided in advance, and it is determined that a turbulent layer is present if a measurement of change rate $\rho_c$ of density is smaller than the threshold value. This makes it possible to reliably detect a turbulent layer having a change rate in density that is smaller than the threshold value.

Another method may be used in which the threshold value on the aforesaid Richardson number $R_i$ is decided in advance, and horizontal wind velocity difference $V_c$ at the observation points 4 is estimated from a generally known atmospheric wind velocity distribution, the estimated value and a measured change rate in density are used, and thickness D of an atmospheric layer is substituted by altitude difference D1' between the two observation points 4 in expression (1) to calculate Richardson number $R_i$ at the altitudes of the two observation points 4. The calculation result is compared with the above threshold value so as to determine the presence of a turbulent layer. This permits further improved accuracy of the detection of a turbulent layer to be achieved since the presence of a turbulent layer is detected on the basis of the values of both horizontal wind velocity difference $V_c$ and change rate $\rho_c$ of density.

To detect a turbulent layer by using information regarding both the magnitude of horizontal wind velocity difference $V_c$ and the magnitude of change rate $\rho_c$ of density, a method may be used in which both the threshold value on horizontal wind velocity difference $V_c$ and the threshold value on the magnitude of change rate $\rho_c$ of density are used. It is determined that a turbulent layer exists if one of the following conditions is satisfied, the conditions being such that a measurement of horizontal wind velocity difference $V_c$ between the two observation points 4 exceeds the threshold value on horizontal wind velocity difference $V_c$, and a measurement of change rate $\rho_c$ of density is smaller than the threshold value on change rate $\rho_c$ of density. This makes it possible to reliably detect a turbulent layer having horizontal wind velocity difference $V_c$ that is larger than the threshold value on horizontal wind velocity difference $V_c$ and the density difference $\rho_c$ that is smaller than the threshold value on density difference.

Alternatively, the threshold value on the aforesaid Richardson number $R_i$ may be decided in advance, and a measured value of horizontal wind velocity difference $V_c$ and a measured value of change rate $\rho_c$ of density at the two observation points 4 may be used, thickness D of an atmospheric layer may be substituted by altitude difference D" between the two observation points 4 in expression (1) to calculate Richardson number $R_i$ at the altitudes of the two observation points 4, and it may be determined that a turbulent layer exists if the calculated Richardson number $R_i$ is smaller than the threshold value on Richardson number $R_i$. This permits further improved accuracy of the detection of a turbulent layer to be achieved since the presence of a turbulent layer is detected using Richardson number $R_i$, which is the value indicating the degree of the turbulence of the atmospheric layer, on the basis of the values of both horizontal wind velocity difference $V_c$ and change rate $\rho_c$ of density.

The operation of the turbulent layer detecting apparatus according to Example 1 of the present invention will now be described. The transmitting section 31 transmits the beam 5 into the atmosphere, and the receiving section 32 receives a signal produced by the beam 5 being scattered by particulates or the like in the atmosphere.

The wind velocity measuring section 33 measures beam direction component $V_b$ of wind velocity at the observation points 4 from the received signal received by the receiving section 32. Meanwhile, the density measuring section 34 measures density from the received signal received by the receiving section 32.

When the wind velocity measuring section 33 measures beam direction component $V_b$ of a wind velocity, the wind velocity measuring section 33 determines wind velocities $V_h$ at the two observation points 4 on the beam 5 according to (Expression 2).

Then, the turbulent layer detecting section 35 detects horizontal wind velocity difference $V_c$ from horizontal wind velocities $V_h$ at the two observation points 4 on the beam 5, and detects a turbulent layer from the magnitude of horizontal wind velocity difference $V_c$. The turbulent layer detecting section 35 also measures the densities at the two observation points 4 on the beam 5, and detects a turbulent layer from the magnitude of change rate $\rho_c$ of density. The turbulent layer detecting section 35 may detect a turbulent layer from the information regarding both the magnitude of horizontal wind velocity difference $V_c$ and the magnitude of change rate $\rho_c$ of density, or may detect a turbulent layer from the information regarding one of the above.

Lastly, if a turbulent layer has been detected, then the turbulent layer detecting apparatus 3 transmits a signal for notifying the aircraft 2 of the presence of a turbulent layer.

The turbulent layer detecting apparatus in Example 1 according to the present invention that is constructed as described above measures the wind velocities and the densities in the upper and lower layers sandwiching a turbulent layer rather than directly measuring the wind velocity in the turbulent layer. The wind velocities and the densities in the upper and lower layers sandwiching the turbulent layer are stable as compared with the wind velocity and the density in a turbulent layer. Hence, an error in measuring wind velocities and densities can be reduced. This permits higher accuracy for detecting turbulent layers.

Furthermore, since the presence of a turbulent layer between the two observation points 4 can be detected from the measurement results of the wind velocities and the densities only at the two observation points 4, there is no need to perform measurement of wind velocity and density at any more points in the atmospheric layer 1, allowing a shortened time required for detection.

Furthermore, both wind velocity and density at a plurality of observation points in the atmosphere are measured from the same received signal, requiring only one transmitting section 31 and one receiving section 31. Thus, the apparatus can be made inexpensive as compared with a conventional method used for measuring potential temperature and wind velocity.

Figure 5:
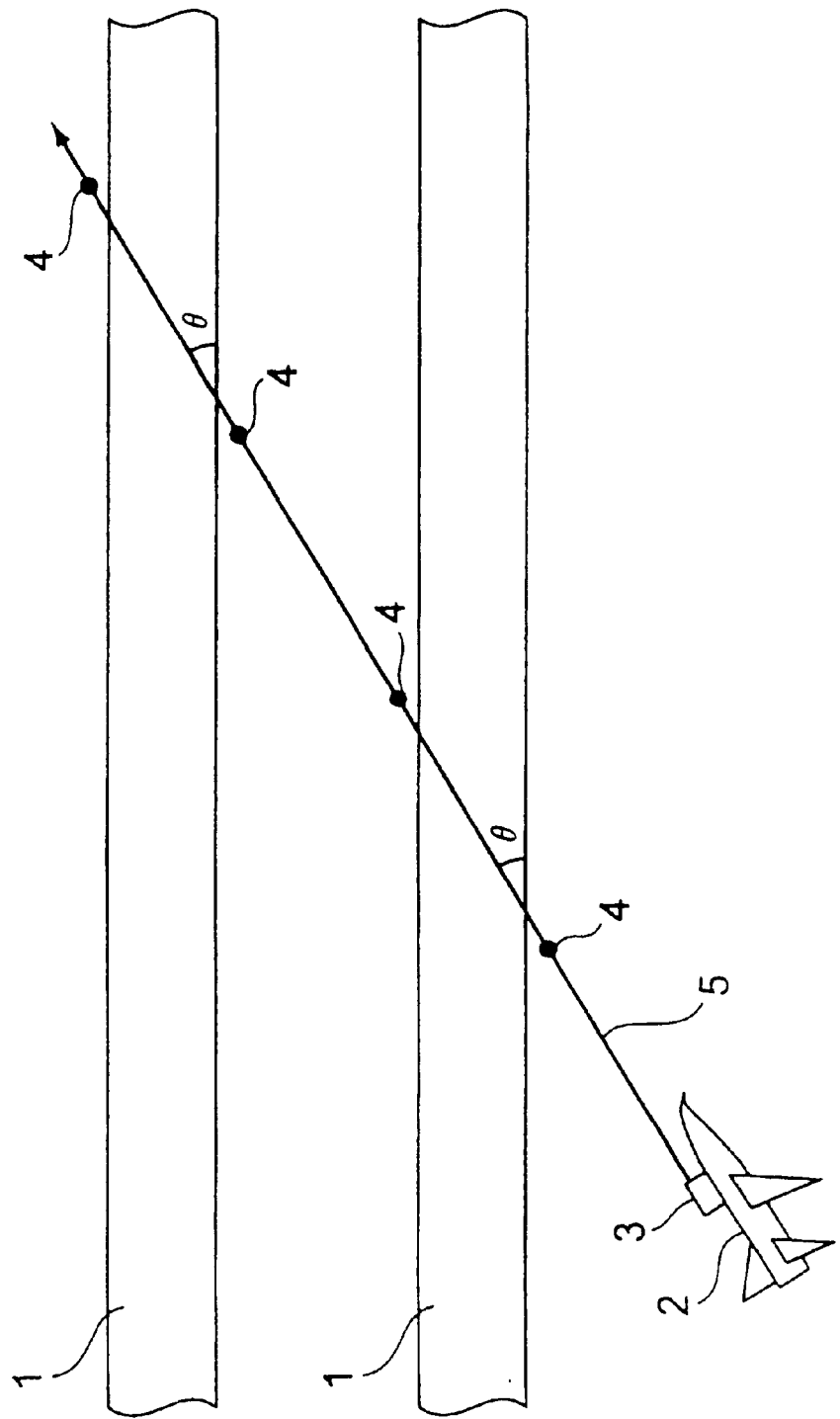
FIG. 5 is a schematic representation illustrating a case where the number of observation points has been increased to four.

In FIG. 1, there are two observation points 4 on the beam 5; however, there may be any number of the observation points 4 as long as there are two or more. FIG. 5 shows a case where there are four observation points 4. As the number of the observation points 4 is increased, in which atmospheric layer 1 a turbulent layer exists can be known in a wider range.

In FIG. 5, the atmospheric layer 1 is horizontal to the surface of the earth; however, if the detection of a turbulent layer is performed on the basis of only the change rate $\rho_2$ in density, the atmospheric layer 1 may not be horizontal to the surface of the earth, or the atmospheric layer 1 may be curved.

Usually, the measurement result of only one of the measurement $\rho_c$ of change rate in density and horizontal wind velocity difference $V_c$ between the upper and lower layers sandwiching the atmospheric layer 1 is used to detect a turbulent layer, and if it is determined that a turbulent layer has been detected, then the presence of the turbulent layer is verified by using the other measurement result. This makes it possible to reduce the number of processing steps implemented on a received signal in the turbulent layer detecting apparatus 3 and to make the apparatus less expensive accordingly, as compared with a case where the measurement of both change rate $\rho_c$ of density and horizontal wind velocity difference $V_c$ between the upper and lower layers sandwiching the atmospheric layer 1 is always performed.

EXAMPLE 2

Figure 6:
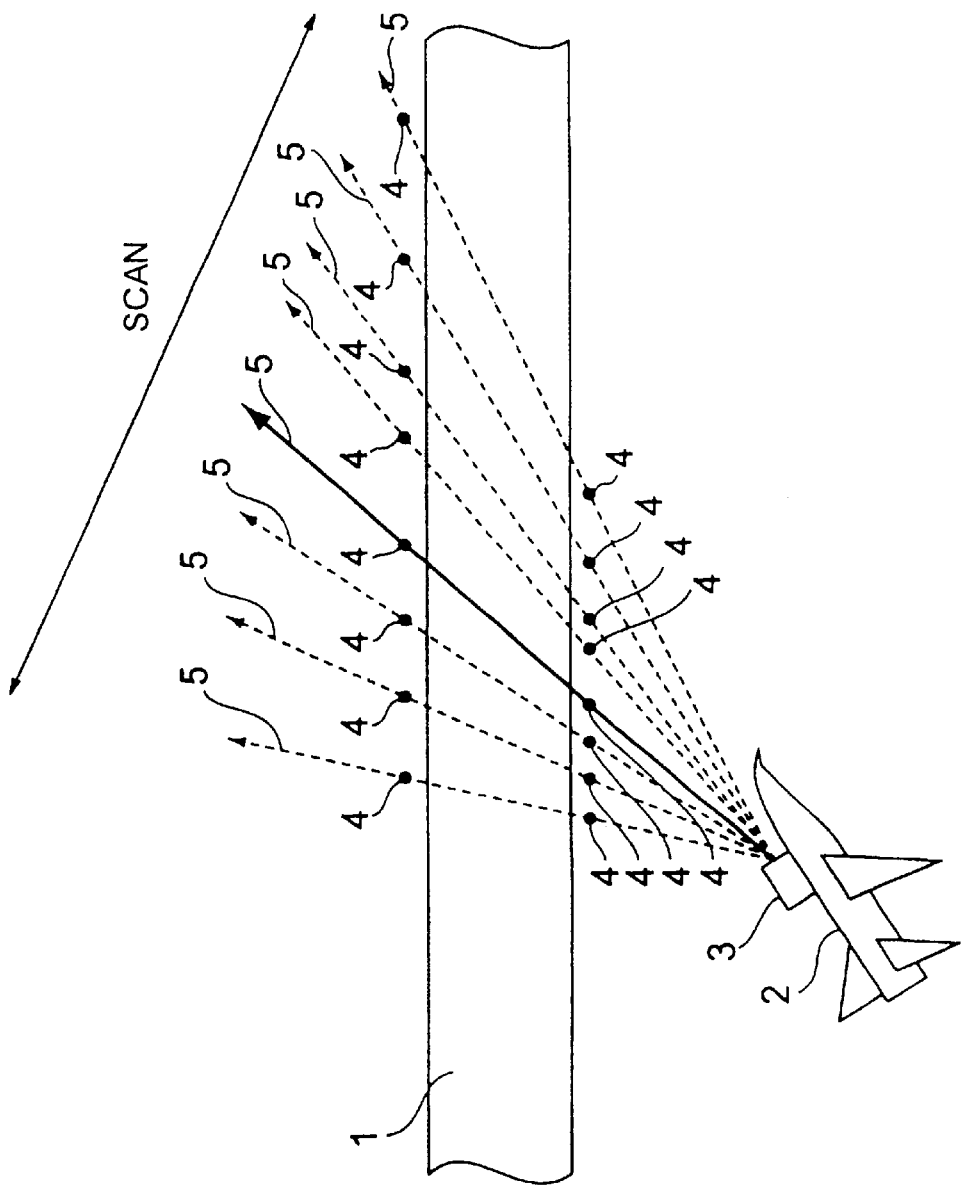
FIG. 6 is a schematic representation illustrating a turbulent layer detecting apparatus according to Example 2 of the present invention.

A turbulent layer detecting apparatus according to Example 2 of the present invention will be described with reference to FIG. 6. FIG. 6 is a schematic representation illustrating the turbulent layer detecting apparatus according to Example 2 of the present invention. In FIG. 6, an atmospheric layer 1 lies horizontally to the surface of the earth. There are two observation points 4 on each beam 5. The upper and lower layers sandwiching the atmospheric layer 1 lie horizontally to the surface of the earth. However, the wind velocities, densities, etc. in each portion of the upper and lower layers sandwiching the atmospheric layer 1 are not necessarily constant. This means that all the portions of the atmospheric layer 1 are not necessarily turbulent layers; instead, a turbulent layer may partially exist in the atmospheric layer 1.

A turbulent layer detecting apparatus 3 shares approximately the same construction as the one shown in FIG. 2 of Example 1, and is equipped with a transmitting section 31 for transmitting the beams 5 of electromagnetic waves, sound waves, or light waves into the atmosphere, and a receiving section 32 that receives the electromagnetic waves, sound waves, or light waves that have been generated by the beams 5 being scattered by particulates or the like in the atmosphere. The transmitting section 31 and the receiving section 32 may be the same section that performs both transmitting and receiving, or they may be separate sections.

In this example, the turbulent layer detecting apparatus 3 sequentially scans the direction of beams 5 of the electromagnetic waves, sound waves, or light waves in the atmosphere.

A wind velocity measuring section 33 measures, from a received signal received by the receiving section 32, beam direction components $V_b$ of the wind velocities at the two observation points 4 on the beam 5 at each point in the process of scanning the direction of the beam 5. A density measuring section 34 measures, from the received signal received by the receiving section 32, the density at the two observation points 4 on the beam 5 at each point in the process of scanning the direction of the beam 5.

Functionally, the turbulent layer detecting apparatus 3 does not necessarily have to be equipped with both the wind velocity measuring section 33 and the density measuring section 34; the apparatus 3 is able to detect a turbulent layer if it is equipped with at least one of them.

The measurement of the beam direction component of a wind velocity by the wind velocity measuring section 33 can be performed by detecting the Doppler shift of the received signal. The measurement of the density by the density measuring section 34 can be performed by measuring the intensity of the received signal.

The wind velocity measuring section 33 determines horizontal wind velocity $V_h$ at the two observation points 4 on the beam 5 at each point in the process of scanning the direction of the beam 5 according to expression (2), which will be shown hereinafter, where θ designates the angle formed by the direction of the beam 5 and the direction of the atmospheric layer 1, and $V_b$ designates the wind velocity in the beam direction.

The altitude difference between the two observation points 4 is set so that it is greater than the thickness of the turbulent layer that need to be detected. More specifically, the distance between the observation points 4 is decided according to expression (3), which will be shown hereinafter, using the thickness of the turbulent layer that must be detected, and the angle formed by the direction of the beam 5 and the direction of the atmospheric layer 1, the thickness of the turbulent layer to be detected being denoted by D'.

At each point in the process of scanning the direction of the beam 5, the distance between the observation points 4 and the distances between the turbulent layer detecting apparatus 3 and the observation points 4 may be changed. Thus, upon completion of the scan of the beam 5, the horizontal components of the wind velocities and the densities in the respective portions of the upper and lower layers sandwiching the atmospheric layer 1 can be determined.

The turbulent layer detecting section 35 detects horizontal wind velocity difference $V_c$ between the upper and lower layers of the atmospheric layer 1 in each portion of the atmospheric layer 1 from horizontal wind velocity $V_h$ at the two observation points 4 on the beam 5 at each point in the process of scanning the direction of the beam 5, and detects the presence of a turbulent layer in each portion of the atmospheric layer 5 from the magnitude of horizontal wind velocity difference $V_c$.

Furthermore, the turbulent layer detecting section 35 measures the densities at the two observation points 4 on the beam 5 at each point in the direction of the beam 5 in the process of scanning the beam 5, and estimates change rate $\rho_c$ of density in each portion of the atmospheric layer 1 according to expression (5), which will be shown hereinafter, wherein the density measured at an observation point of the layer in contact with the top of the atmospheric layer 1 is designated as $\rho''_1$, the density measured at an observation point of the layer in contact with the bottom of the atmospheric layer 1 is designated as $\rho''_2$, and the altitude difference between the observation point 4 of the layer in contact with the top of the atmospheric layer 1 and the observation point 4 of the layer in contact with the bottom of the atmospheric layer 1 is designated as D1 in each portion of the atmospheric layer 1. Based on the magnitude of the estimated change rate $\rho_c$ of density, the presence of a turbulent layer in each portion of the atmospheric layer 1 is detected.

To detect a turbulent layer from the magnitude of horizontal wind velocity difference $V_c$, a method may be used in which a threshold value on horizontal wind velocity difference $V_c$ is decided in advance, and it is determined that a turbulent layer exists if a measurement of horizontal wind velocity difference $V_c$ exceeds the above threshold value.

Another method may be used in which the threshold value on the above Richardson number $R_i$ is decided in advance, and change rate $\rho_c$ of density is estimated from a generally known atmospheric density distribution, as shown in, for example, literature [2] (Scientific chronology (Year 1997 edition), p.383, edited by National Observatory, published by Maruzen). The estimated value and a measured wind velocity difference $V_c$ are used, and thickness D of an atmospheric layer is substituted by altitude difference D1 between the two observation points 4 in each portion of the upper and lower layers sandwiching the atmospheric layer 1 in expression (1) to calculate Richardson number $R_i$ at the altitudes of the two observation points 4. The calculation result is compared with the above threshold value on the Richardson number so as to determine the presence of a turbulent layer.

To detect a turbulent layer from the magnitude of change rate $\rho_c$ of density, a method may be used in which the threshold value on change rate $\rho_c$ of density is decided in advance, and it is determined that a turbulent layer is present if a measurement of change rate $\rho_c$ of density in each portion of the atmospheric layer 1 is smaller than the threshold value.

Another method may be used in which the threshold value on the aforesaid Richardson number $R_i$ is decided in advance, and horizontal wind velocity difference $V_c$ at the observation points 4 is estimated from a generally known atmospheric wind velocity distribution, the estimated value and a measured change rate $\rho_c$ of density are used, and thickness D of an atmospheric layer is substituted by altitude difference D1 between the two observation points 4 in each portion of the upper and lower layers sandwiching the atmospheric layer 1 in expression (1) to calculate Richardson number $R_i$ at the altitudes of the two observation points 4. The calculation result is compared with the above threshold value on the Richardson number so as to determine the presence of a turbulent layer.

To detect a turbulent layer by using information regarding both the magnitude of horizontal wind velocity difference $V_c$ and the magnitude of change rate $\rho_c$ of density, a method may be used in which both the threshold value on horizontal wind velocity difference $V_c$ and the threshold value on change rate $\rho_c$ of density are decided in advance, and it is determined that a turbulent layer exists if one of the following conditions is satisfied, the conditions being such that a measurement of horizontal wind velocity difference $V_c$ exceeds the threshold value on horizontal wind velocity difference $V_c$ in each portion of the atmospheric layer 1, and a measurement of change rate $\rho_c$ of density is smaller than the threshold value on change rate $\rho_c$ of density.

Alternatively, the threshold value on the aforesaid Richardson number $R_i$ may be decided in advance, and in each portion of the atmospheric layer 1, based on a measured value of horizontal wind velocity difference $V_c$ and a measured value of change rate $\rho_c$ of density at the observation points 4 located in the upper and lower layers of the atmospheric layer 1, thickness D of an atmospheric layer may be substituted by altitude difference D1 between the two observation points 4 in each portion of the upper and lower layers sandwiching the atmospheric layer 1 in expression (1) to calculate Richardson number $R_i$ at the altitudes of the two observation points 4, and it may be determined that a turbulent layer exists if the calculated Richardson number $R_i$ is smaller than the threshold value on Richardson number $R_i$.

The operation of the turbulent layer detecting apparatus according to Example 2 of the present invention will now be described. The transmitting section 31 transmits the beam 5 into the atmosphere while scanning the beam 5, and the receiving section 32 receives a signal produced by the beam 5 being scattered by particulates or the like in the atmosphere, at each point in the direction of the beam 5 in the process of scanning the beam 5.

The wind velocity measuring section 33 measures beam direction component $V_b$ of the wind velocities at the observation points 4 from the received signal received by the receiving section 32, at each point of the process of scanning the direction of the beam 5. Meanwhile, the density measuring section 34 measures density from the received signal received by the receiving section 32, at each point of the process of scanning the direction of the beam 5.

When the wind velocity measuring section 33 measures beam direction components $V_b$ of wind velocities, the wind velocity measuring section 33 determines wind velocities $V_h$ at the two observation points 4 on the beam 5 according to (Expression 2).

Then, the turbulent layer detecting section 35 detects horizontal wind velocity difference $V_c$ between the upper and lower layers of the atmospheric layer 1 in each portion of the atmospheric layer 1 from horizontal wind velocities $V_h$ at the two observation points 4 on the beam 5, and detects the presence of a turbulent layer in each portion of the atmospheric layer 5 from the magnitude of horizontal wind velocity difference $V_c$.

The turbulent layer detecting section 35 also measures the densities at the two observation points 4 on the beam 5 at each point in the process of scanning the direction of the beam 5, and estimates change rate $\rho_c$ of density in each portion of the atmospheric layer 1 from the density measured at the observation point in the layer in contact with the top of the atmospheric layer 1 and density measured at the observation point in the layer in contact with the top of the atmospheric layer 1 in each portion of the atmospheric layer 1, and detects the presence of a turbulent layer in each portion of the atmospheric layer 1 from the magnitude of the estimated change rate $\rho_c$ of density. The turbulent layer detecting section 35 may detect a turbulent layer from the information regarding both the magnitude of horizontal wind velocity difference $V_c$ and the magnitude of change rate $\rho_c$ of density, or may detect a turbulent layer from the information regarding one of the above.

Lastly, if a turbulent layer has been detected, then the turbulent layer detecting apparatus 3 transmits a signal for notifying an aircraft 2 of the presence of a turbulent layer.

The turbulent layer detecting apparatus in Example 2 according to the present invention that is constructed as described above measures the wind velocities and the densities in the upper and lower layers sandwiching a turbulent layer rather than directly measuring the wind velocity in the turbulent layer. The wind velocities and the densities in the upper and lower layers sandwiching the turbulent layer are stable as compared with the wind velocity and the density in a turbulent layer. Hence, an error in measuring wind velocities and densities can be reduced. This permits higher accuracy for detecting turbulent layers.

Furthermore, since the presence of a turbulent layer between the two observation points 4 can be detected from the measurement results of the wind velocities and the densities only at the two observation points 4, there is no need to perform measurement of wind velocity and density at any more points in the atmospheric layer 1, allowing a shortened time required for detection.

Furthermore, both wind velocity and density at a plurality of observation points in the atmosphere are measured from the same received signal, requiring only one transmitting section and one receiving section. Thus, the apparatus can be made inexpensive as compared with a conventional method used for measuring potential temperature and wind velocity.

The horizontal components of wind velocities and densities of the upper and lower layers in a plurality of portions of the atmospheric layer 1 are measured by scanning the beam 5, the presence of a turbulent layer can be detected even if the atmospheric layer 1 and the upper and lower layers sandwiching the atmospheric layer 1 are not horizontally uniform. Moreover, the distribution of existing turbulent layers and the profiles of turbulent layers can be detected.

Figure 7:
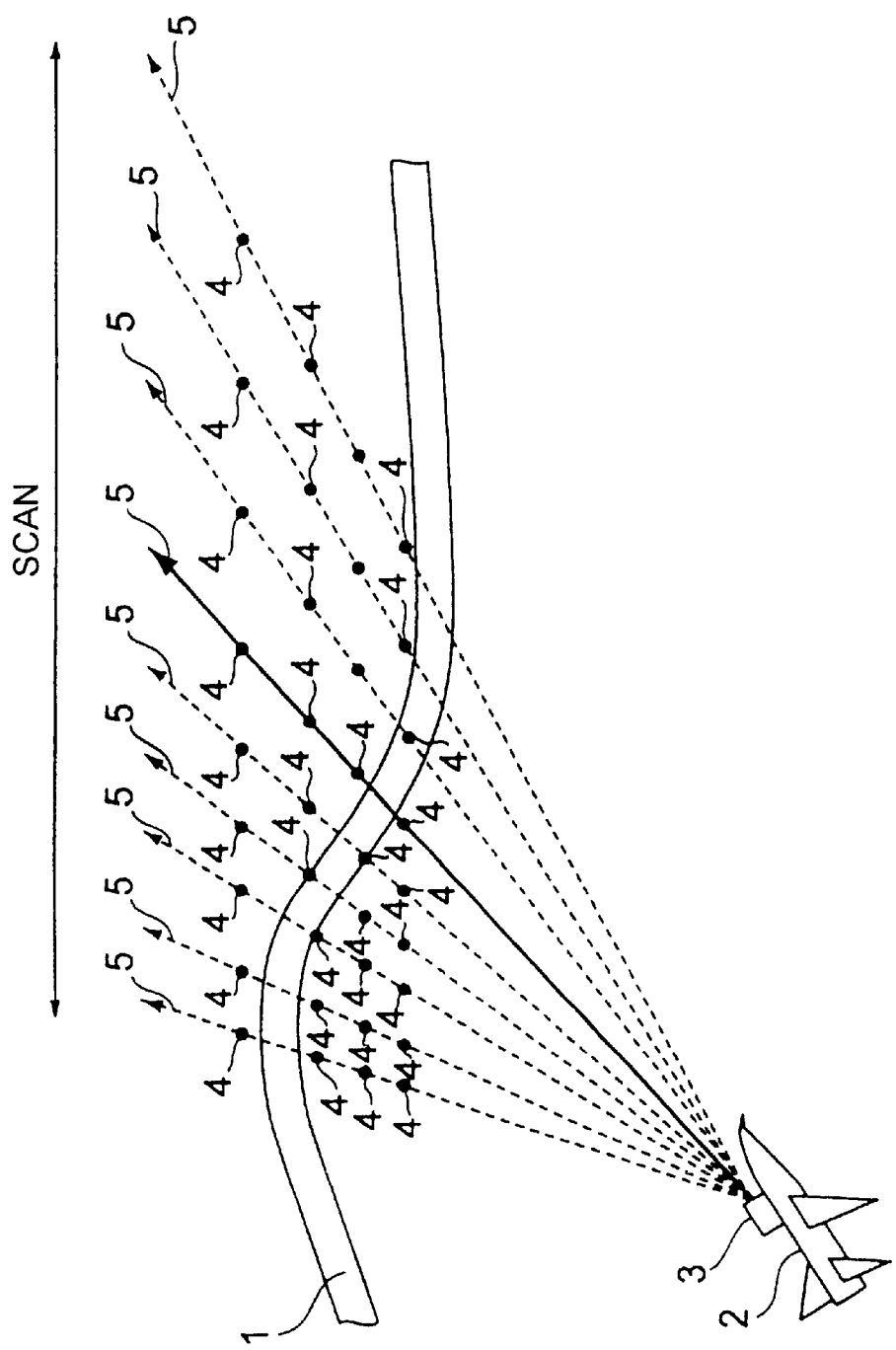
FIG. 7 is a schematic representation illustrating the detection of a curved atmospheric layer in Example 2.

In FIG. 6, the atmospheric layer 1 is horizontal to the surface of the earth; however, if the detection of a turbulent layer is performed on the basis of the change rate in density, the atmospheric layer 1 may not have to be horizontal to the surface of the earth, or the atmospheric layer 1 may be curved, as shown in FIG. 7.

In FIG. 6, there are two observation points 4 on the beam 5 at each point in the process of scanning the direction of the beams 5; however, there may be any number of the observation points 4 as long as there are two or more. FIG. 7 shows a case where there are four observation points 4 on each of the beams 5. As the number of the observation points 4 on each of the beams 5 is increased, the presence of a turbulent layer in the atmospheric layer 1 can be known in a wider range by using the measurement results of both change rate $\rho_c$ of density and wind velocity difference $V_c$ between the upper and lower layers of the atmospheric layer 1. This allows higher accuracy in the detection of a turbulent layer to be achieved in a case where the atmospheric layer 1 is not horizontal.

Usually, the measurement result of only one of the measurement $\rho_c$ of the change rate in density and horizontal wind velocity difference $V_c$ between the upper and lower layers sandwiching the atmospheric layer 1 mentioned above is used to detect a turbulent layer, and if it is determined that a turbulent layer has been detected, then the presence of the turbulent layer is verified by using the other measurement result. This makes it possible to reduce the number of processing steps implemented on a received signal in the turbulent layer detecting apparatus 3 so as to make the apparatus less expensive accordingly, as compared with a case where the measurement of both change rate $\rho_c$ of density and horizontal wind velocity difference $V_c$ between the upper and lower layers sandwiching the atmospheric layer 1 is always performed.

EXAMPLE 3

Figure 8:
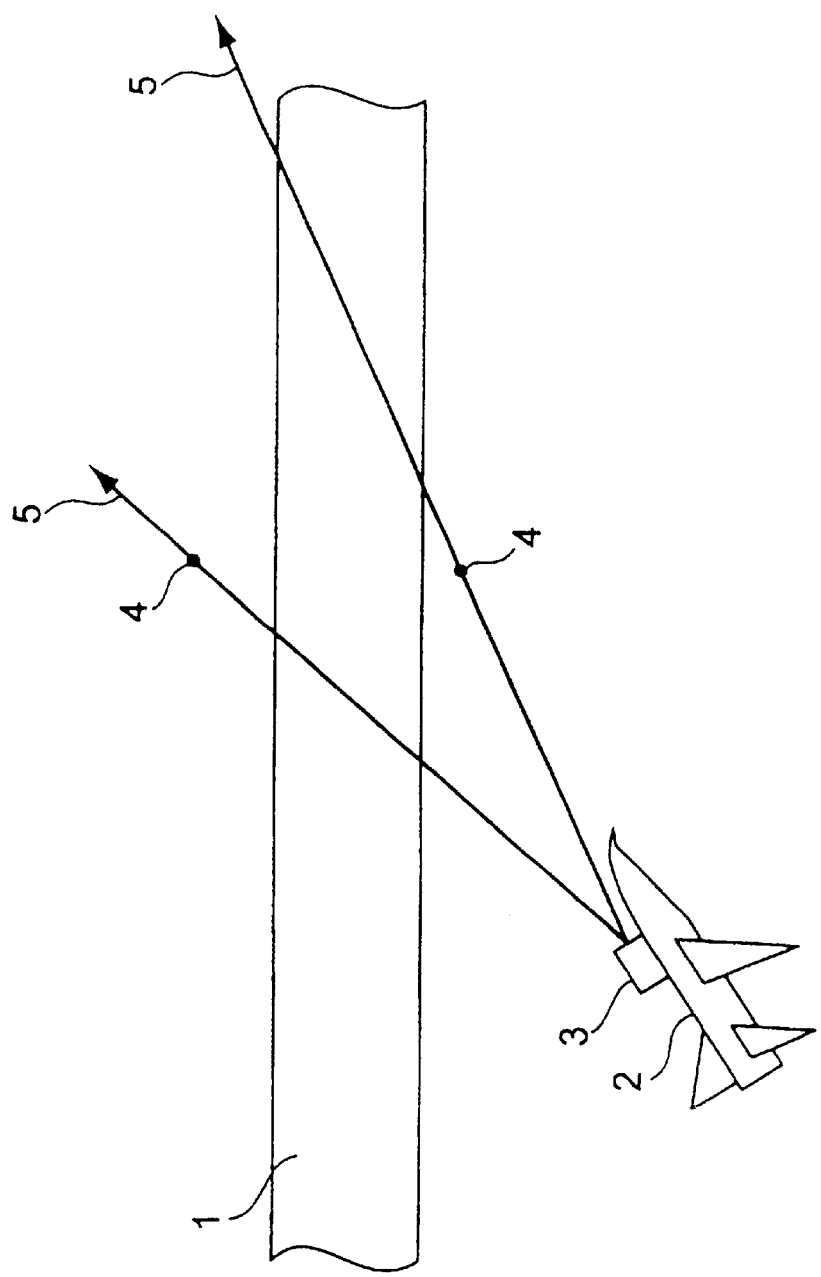
FIG. 8 is a schematic representation illustrating a turbulent layer detecting apparatus according to Example 3 of the present invention.

A turbulent layer detecting apparatus according to Example 3 in accordance with the present invention will be described with reference to FIG. 8. FIG. 8 is a schematic representation illustrating the turbulent layer detecting apparatus according to Example 3 of the present invention. In FIG. 8, an atmospheric layer 1 lies horizontally to the surface of the earth.

A turbulent layer detecting apparatus 3 shares approximately the same construction as the one shown in FIG. 2 of Example 1, and is equipped with a transmitting section 31 for transmitting two beams 5 of electromagnetic waves, sound waves, or light waves, and a receiving section 32 that receives the electromagnetic waves, sound waves, or light waves that have been generated by each of the two beams 5 being scattered by particulates or the like in the atmosphere. The transmitting section 31 and the receiving section 32 may be the same section that performs both transmitting and receiving, or they may be separate sections.

In FIG. 8, the upper and lower layers sandwiching the atmospheric layer 1 lie horizontally to the surface of the earth. However, the wind velocities, densities, etc. in each portion of the upper and lower layers sandwiching the atmospheric layer 1 are not necessarily constant. This means that all the portions of the atmospheric layer 1 are not necessarily turbulent layers; instead, a turbulent layer may partially exist in the atmospheric layer 1.

A wind velocity measuring section 33 measures, from a received signal received by the receiving section 32, the beam direction component of a wind velocity at the observation point 4 on each of the two beams. A density measuring section 34 measures the density at the observation point 4 on each of the two beams from the received signal received by the receiving section 32.

Functionally, the turbulent layer detecting apparatus 3 does not necessarily have to be equipped with both the wind velocity measuring section 33 and the density measuring section 34; the apparatus 3 is able to detect a turbulent layer if it is equipped with at least one of them.

The measurement of the beam direction component of a wind velocity by the wind velocity measuring section 33 can be performed by detecting the Doppler shift of the received signal. The measurement of the density by the density measuring section 34 can be performed by measuring the intensity of the received signal.

The wind velocity measuring section 33 determines horizontal wind velocity $V_h$ at the observation point 4 on each of the two beams according to expression (2), which will be shown hereinafter, where $\theta$ designates the angle formed by the direction of the beam 5 and the direction of the atmospheric layer 1, and $V_b$ designates the wind velocity in the beam direction.

The observation points 4 on the two beams are provided at two locations along the perpendicular direction with respect to the surface of the earth.

The altitude difference between the observation points 4 on the two beams is set so that it is greater than the thickness of the turbulent layer that need to be detected. More specifically, distance L between the observation points 4 is decided according to expression (3), which will be shown hereinafter, using the thickness of the turbulent layer that must be detected, and the angle formed by the direction of the beam 5 and the direction of the atmospheric layer 1, the thickness of the turbulent layer to be detected being denoted by D'.

Thus, horizontal components $V_h$ of the wind velocity and the densities of the upper and lower layers sandwiching a certain portion of the atmospheric layer 1 can be determined.

The turbulent layer detecting section 35 detects horizontal wind velocity difference $V_c$ between the upper and lower layers of the atmospheric layer 1 in a certain portion of the atmospheric layer 1 by measuring horizontal wind velocity $V_h$ at the observation points 4 on the two beams, and detects the presence of a turbulent layer in each portion of the atmospheric layer 1 from the magnitude of horizontal wind velocity difference $V_c$.

Furthermore, the turbulent layer detecting section 35 measures the densities at the observation points 4 on the two beams, and measures change rate $\rho_c$ of density in a certain portion of the atmospheric layer 1 according to expression (5), which will be shown hereinafter, wherein the density measured at the observation point of the layer in contact with the top of the atmospheric layer 1 is designated as $\rho''_1$, and the density measured at the observation point of the layer in contact with the top of the atmospheric layer 1 is designated as $\rho''_2$. Based on the magnitude of the measured change rate $\rho_c$ of density, the presence of a turbulent layer in the certain portion of the atmospheric layer 1 is detected.

To detect a turbulent layer from the magnitude of horizontal wind velocity difference $V_c$, a method may be used in which the threshold value on horizontal wind velocity difference $V_c$ is decided in advance, and it is determined that a turbulent layer exists if a measurement of horizontal wind velocity difference $V_c$ exceeds the above threshold value.

Another method may be used in which the threshold value on the above Richardson number $R_i$ is decided in advance, and change rate $\rho_c$ of density is estimated from a generally known atmospheric density distribution, as shown in, for example, literature [2] (Scientific chronology (Year 1997 edition), p.383, edited by National Observatory, published by Maruzen). The estimated value and a measured horizontal wind velocity difference $V_c$ are used, and thickness D of an atmospheric layer is substituted by altitude difference D1 between the two observation points 4 in each portion of the upper and lower layers sandwiching the atmospheric layer 1 in expression (1) to calculate Richardson number $R_i$ at the altitudes of the two observation points 4. The calculation result is compared with the above threshold value on the Richardson number so as to determine the presence of a turbulent layer.

To detect a turbulent layer from the magnitude of the change rate in density, a method may be used in which the threshold value on change rate $\rho_c$ of density is decided in advance, and it is determined that a turbulent layer is present if a measurement of change rate $\rho_c$ of density is smaller than the threshold value.

Another method may be used in which the threshold value on the aforesaid Richardson number $R_i$ is decided in advance, and horizontal wind velocity difference $V_c$ at the observation points 4 is estimated from a generally known atmospheric wind velocity distribution, the estimated value and a measured change rate $\rho_c$ of density are used, and thickness D of an atmospheric layer is substituted by altitude difference D1 between the two observation points 4 in each portion of the upper and lower layers sandwiching the atmospheric layer 1 in expression (1) to calculate Richardson number $R_i$ at the altitudes of the two observation points 4. The calculation result is compared with the above threshold value on the Richardson number so as to determine the presence of a turbulent layer.

To detect a turbulent layer by using information regarding both the magnitude of horizontal wind velocity difference $V_c$ and the magnitude of change rate $\rho_c$ of density, a method may be used in which both the threshold value on horizontal wind velocity difference $V_c$ and the threshold value on change rate $\rho_c$ of density are decided in advance, and it is determined that a turbulent layer exists if one of the following conditions is satisfied, the conditions being such that a measurement of horizontal wind velocity difference $V_c$ exceeds the threshold value on horizontal wind velocity difference $V_c$ in each portion of the atmospheric layer 1, and a measurement of change rate $\rho_c$ of density is smaller than the threshold value on change rate $\rho_c$ of density.

Alternatively, the threshold value on the aforesaid Richardson number $R_i$ may be decided in advance, and in each portion of the atmospheric layer 1, based on a measurement of horizontal wind velocity difference $V_c$ and a measurement of change rate $\rho_c$ of density at the observation points 4 located in the upper and lower layers of the atmospheric layer 1, thickness D of an atmospheric layer may be substituted by altitude difference D1 between the two observation points 4 in each portion of the upper and lower layers sandwiching the atmospheric layer 1 in expression (1) to calculate Richardson number $R_i$ at the altitudes of the two observation points 4, and it may be determined that a turbulent layer exists if the calculated Richardson number $R_i$ is smaller than the threshold value on Richardson number $R_i$.

The operation of the turbulent layer detecting apparatus according to Example 3 of the present invention will now be described. The transmitting section 31 transmits the two beams 5 into the atmosphere. The receiving section 32 receives signals on the respective two beams 5, which signals are produced by the beams 5 being scattered by particulates or the like in the atmosphere.

The wind velocity measuring section 33 measures, on each of the two beams 5, beam direction components $V_b$ of the wind velocities at the observation points 4 from the received signal received by the receiving section 32. Meanwhile, the density measuring section 34 measures, on each of the two beams 5, density from the received signal received by the receiving section 32.

When the wind velocity measuring section 33 measures beam direction component $V_b$ of a wind velocity, the wind velocity measuring section 33 determines wind velocities $V_h$ at the two observation points 4 on the beam 5 according to (Expression 2).

Then, the turbulent layer detecting section 35 detects horizontal wind velocity difference $V_c$ between the upper and lower layers of the atmospheric layer 1 in a certain portion of the atmospheric layer 1 by measuring horizontal wind velocities $V_h$ at the observation points 4 on the two beams 5, and detects the presence of a turbulent layer in each portion of the atmospheric layer 1 from the magnitude of horizontal wind velocity difference $V_c$.

The turbulent layer detecting section 35 measures the densities at the observation points 4 on the two beams 5, and estimates change rate $\rho_c$ of density in a certain portion of the atmospheric layer 1, and detects the presence of a turbulent layer in the certain portion of the atmospheric layer 1 from the magnitude of the estimated change rate $\rho_c$ of density. The turbulent layer detecting section 35 may detect a turbulent layer from the information regarding both the magnitude of horizontal wind velocity difference $V_c$ and the magnitude of change rate $\rho_c$ of density, or may detect a turbulent layer from the information regarding one of the above.

Lastly, the turbulent layer detecting section 35, if a turbulent layer has been detected, then the turbulent layer detecting apparatus 3 transmits a signal for notifying an aircraft 2 of the presence of a turbulent layer.

The turbulent layer detecting apparatus in Example 3 according to the present invention that is constructed as described above measures the wind velocities and the densities in the upper and lower layers sandwiching a turbulent layer rather than directly measuring the wind velocity in the turbulent layer. The wind velocities and the densities in the upper and lower layers sandwiching the turbulent layer are stable as compared with the wind velocity and the density in a turbulent layer. Hence, an error in measuring wind velocities and densities can be reduced. This permits higher accuracy for detecting turbulent layers.

Furthermore, since the presence of a turbulent layer between the two observation points 4 can be detected from the measurement results of the wind velocities and the densities only at the two observation points 4, there is no need to perform measurement of wind velocity and density at any more points in the atmospheric layer 1, allowing a shortened time required for detection.

Furthermore, both wind velocity and density at a plurality of observation points in the atmosphere are measured from the same received signal, requiring only one transmitting section and one receiving section. Thus, the apparatus can be made inexpensive as compared with a conventional method used for measuring potential temperature and wind velocity.

In FIG. 8, the quantity of the beams 5 is two; however, the quantity may be three or more so as to allow the presence of a turbulent layer to be detected at a plurality of portions of the upper and lower layers sandwiching the atmospheric layer 1. This will make it possible to detect the distribution of existing turbulent layers and the profiles of turbulent layers.

Figure 9:
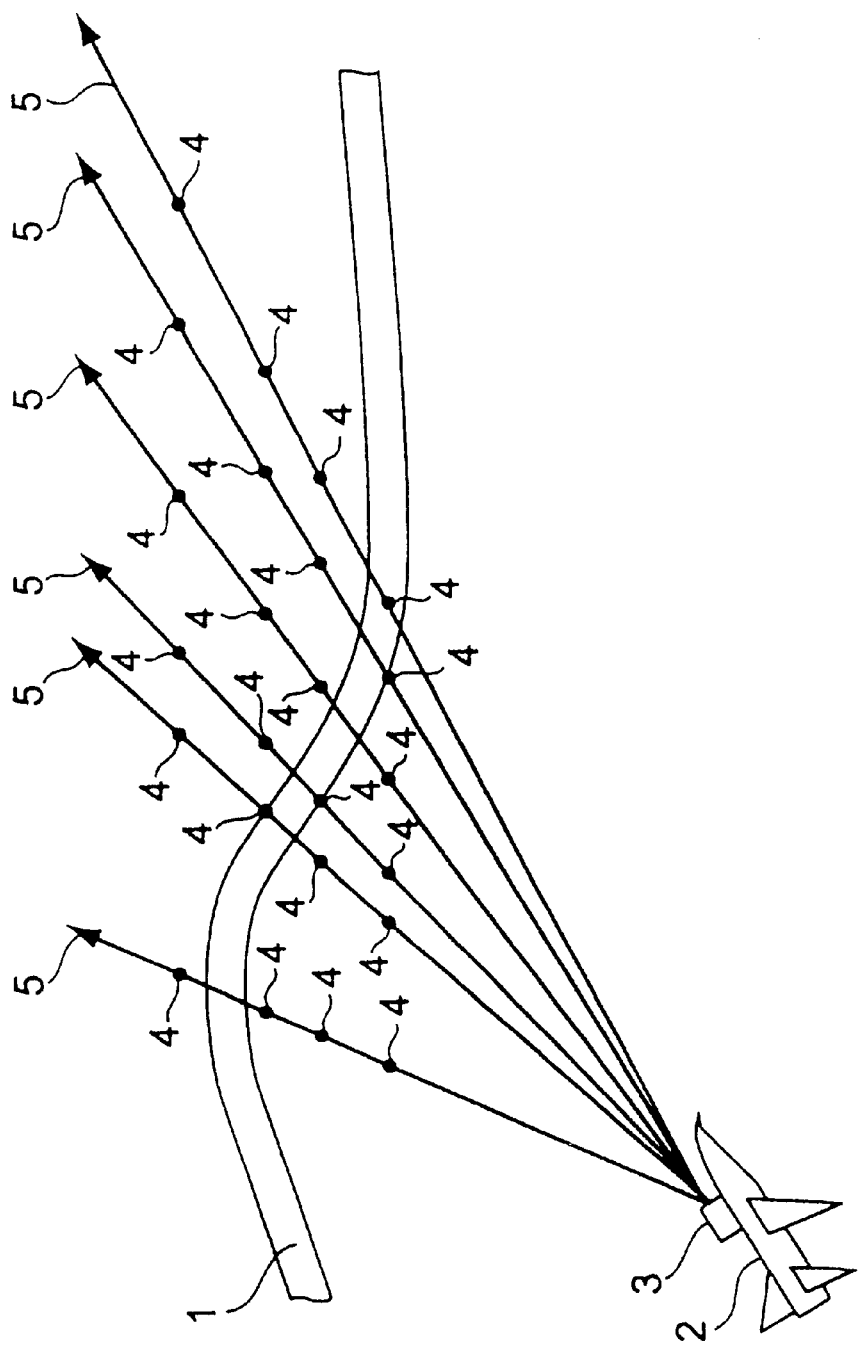
FIG. 9 is a schematic representation illustrating the detection of a curved atmospheric layer in Example 3.

In FIG. 8, the atmospheric layer 1 is horizontal to the surface of the earth. However, to detect a turbulent layer from change rate $\rho_c$ of density, the atmospheric layer 1 may not be horizontal to the surface of the earth, and the atmospheric layer 1 may be curved, as shown in FIG. 9.

In FIG. 8, there are two observation points 4 on the beams 5; however, there may be any number of the observation points 4 as long as there are two or more. FIG. 9 shows a case where there are four observation points 4 on each of the beams 5. As the number of the observation points 4 on each of the beams 5 is increased, the presence of a turbulent layer in the atmospheric layer 1 can be known in a wider range by using the measurement results of both change rate $\rho_c$ of density and wind velocity difference $V_c$ between the upper and lower layers of the atmospheric layer 1. This allows higher accuracy in the detection of a turbulent layer to be achieved in a case where the atmospheric layer 1 is not horizontal.

Usually, the measurement result of only one of the measurement $\rho_c$ of the change rate in density and horizontal wind velocity difference $V_c$ between the upper and lower layers sandwiching the atmospheric layer 1 mentioned above is used to detect a turbulent layer, and if it is determined that a turbulent layer has been detected, then the presence of the turbulent layer is verified by using the other function. This makes it possible to reduce the number of processing steps implemented on a received signal in the turbulent layer detecting apparatus 3 so as to make the apparatus less expensive accordingly, as compared with a case where the measurement of both change rate $\rho_c$ of density and horizontal wind velocity difference $V_c$ between the upper and lower layers sandwiching the atmospheric layer 1 is always performed.

EXPRESSIONS $$R_t = \frac{g(\rho_1 - \rho_2)}{D\left(\frac{\rho_1 + \rho_2}{2}\right)} \left(\frac{D}{v_1 - v_2}\right)^2 \quad (1)$$

$$v_h = v_b \cos\theta \quad (2)$$

$$L > \frac{D'}{\sin\theta} \quad (3)$$

$$\rho_c = \frac{(\rho_1' - \rho_2')}{\left(\frac{\rho_1' + \rho_2'}{2}\right)} \quad (4)$$

$$\rho_c = \frac{(\rho_1'' - \rho_2'')}{\left(\frac{\rho_1'' + \rho_2''}{2}\right)} \quad (5)$$

Industrial Applicability

The turbulent layer detecting apparatus according to the present invention is equipped with a transmitting section that transmits beams of electromagnetic waves, sound waves or light waves into the atmosphere, a receiving section that receives the electromagnetic waves, the sound waves, or the light waves that have been transmitted by the transmitting section and scattered by particulates or the like in the atmosphere, a wind velocity measuring section that measures a beam direction component of a wind velocity at two or more observation points on a beam from a received signal received by the receiving section, or a density measuring section that measures a density at two or more observation points on the beam, and a turbulent layer detecting section that detects the presence of a turbulent layer on the basis of the output of either the wind velocity measuring section or the density measuring section. This arrangement makes it possible to measure the wind velocities and densities in the upper and lower layers sandwiching a turbulent layer rather than directly measuring the wind velocity in a turbulent layer. The wind velocity and the density in the upper and lower layers sandwiching the turbulent layer are stable in comparison with the wind velocity and the density in the turbulent layer. Hence, the error in measuring the wind velocity and the density can be reduced. This permits higher accuracy in the detection of a turbulent layer.

The wind velocity measuring section determines the wind velocity in a horizontal direction from the beam direction component of the wind velocity. This allows the presence of a turbulent layer to be detected based on a Richardson number.

The difference in altitude between two adjacent observation points of two or more observation points is greater than the thickness of the turbulent layer to be detected. Hence, setting the distance between the observation points to a greater value than the thickness of the turbulent layer to be detected makes it possible to prevent both of the two adjoining observation points from existing in the turbulent layer having the thickness that must be detected. This makes it possible to increase the probability in which two adjoining observation points can be disposed in the upper and lower layers sandwiching the turbulent layer having the thickness that must be detected.

The turbulent layer detecting section detects a horizontal wind velocity difference from the horizontal wind velocities at two adjoining observation points of two or more observation points on a beam so as to detect a turbulent layer from the magnitude of the horizontal wind velocity difference, or measures the densities at two adjoining observation points at two or more observation points on the beam and measures the change rate in the density at the altitudes of the two adjoining observation points so as to detect a turbulent layer from the level of the change rate in the density. Therefore, as can be understood from the relationship between the Richardson number and the presence of a turbulent layer, the horizontal wind velocity difference and the change rate in density provide indexes in detecting a turbulent layer. Hence, the presence of a turbulent layer can be detected with high accuracy by measuring horizontal wind velocity difference and the change rate in density.

The turbulent layer detecting section has a predetermined threshold value on the horizontal wind velocity difference, and determines that a turbulent layer exists if a horizontal wind velocity difference exceeds the threshold value. This enables reliable detection of a turbulent layer having a horizontal wind velocity difference that is the predetermined threshold value or more.

The turbulent layer detecting section has a predetermined threshold value on the Richardson number, estimates a change rate in density from a known atmospheric density distribution, uses the estimated change rate in density and a measured horizontal wind velocity difference to calculate the Richardson number, and determines that a turbulent layer exists if the calculated Richardson number is smaller than the predetermined threshold value on the Richardson number. Thus, since the presence of a turbulent layer is detected on the basis of both the value of the horizontal wind velocity difference and the value of the change rate in density, the accuracy of the detection of a turbulent layer can be further improved.

The turbulent layer detecting section has a predetermined threshold value on the change rate in density, and determines that a turbulent layer exists if a measurement of the change rate in density is smaller than the threshold value. This enables reliable detection of a turbulent layer having a change rate in density that is smaller than the predetermined threshold value.

The turbulent layer detecting section has a predetermined threshold value on the Richardson number, estimates a horizontal wind velocity difference from a known atmospheric wind velocity distribution, uses the estimated horizontal wind velocity difference and a measured change rate in density to calculate the Richardson number, and determines that a turbulent layer exists if the calculated Richardson number is smaller than the predetermined threshold value on the Richardson number. Thus, since the presence of a turbulent layer is detected on the basis of both the value of the horizontal wind velocity difference and the value of the change rate in density, the accuracy of the detection of a turbulent layer can be further improved.

The turbulent layer detecting section has a predetermined threshold value on the horizontal wind velocity difference and a predetermined threshold value on the change rate in density, and determines that a turbulent layer exists if at least one of the following conditions is satisfied, the conditions being such that a measurement of the horizontal wind velocity difference exceeds the predetermined threshold value on the horizontal wind velocity difference, and a measurement of the change rate in density is smaller than the predetermined threshold value on the change rate in density. This makes it possible to reliably detect a turbulent layer having a horizontal wind velocity difference that is larger than the predetermined threshold value on the horizontal wind velocity difference or a density difference that is smaller than the predetermined threshold value on the density difference.

The turbulent layer detecting section has a predetermined threshold value on the Richardson number, uses a measurement of the horizontal wind velocity difference and a measurement of the change rate in density to calculate the Richardson number, and determines that a turbulent layer exists if the calculated Richardson number is smaller than the predetermined threshold value on the Richardson number. Thus, based on both the value of the horizontal wind velocity difference and the value of the change rate in density, the presence of a turbulent layer is detected by using the Richardson number which is the value indicating the degree of turbulence of a turbulent layer, permitting further improved accuracy of the detection of a turbulent layer.

The turbulent layer detecting section uses a measurement result of either the change rate in density or the horizontal wind velocity difference to detect a turbulent layer, and if it determines that a turbulent layer has been detected, then it verifies the presence of the turbulent layer by employing the other measurement result. Hence, by using the measurement result of only one of the change rate in density and horizontal wind velocity difference to detect a turbulent layer, and by using the other measurement result to verify the presence of a turbulent layer if it is determined that the turbulent layer has been detected, the number of processing steps implemented on a received signal in the turbulent layer detecting apparatus can be reduced, making the apparatus less expensive accordingly, as compared with a case where the measurement of both change rate in density and horizontal wind velocity difference is always performed.

The transmitting section sequentially scans the direction of beams in the atmosphere, and the receiving section receives the scanned beams that have been scattered by particulates or the like in the atmosphere. Hence, the horizontal components of wind velocities and densities of the upper and lower layers in a plurality of portions of an atmospheric layer are measured by scanning the beam, so that the presence of a turbulent layer can be detected even if the atmospheric layer and the upper and lower layers sandwiching the atmospheric layer are not horizontally uniform. Moreover, the distribution of existing turbulent layers and the profiles of turbulent layers can be detected.

The wind velocity measuring section measures the beam direction component of the wind velocity at two or more observation points on the beam, and the density measuring section measures the density at two or more observation points on the beam at each point in the process of scanning the direction of the beam. This arrangement makes it possible to measure the wind velocities and densities in the upper and lower layers sandwiching a turbulent layer rather than directly measuring the wind velocity in a turbulent layer. The wind velocity and the density in the upper and lower layers sandwiching the turbulent layer are stable in comparison with the wind velocity and the density in the turbulent layer. Hence, the error in measuring the wind velocity and the density can be reduced. This permits higher accuracy in the detection of a turbulent layer.

The wind velocity measuring section determines the horizontal wind velocity from the beam direction component of the wind velocity at each point in the process of scanning the direction of the beam. Hence, by employing the horizontal wind velocity, the presence of a turbulent layer can be detected on the basis of a Richardson number.

The altitude difference of two adjoining observation points of two or more observation points is greater than the thickness of a turbulent layer to be detected. Hence, setting the distance between the observation points to a greater value than the thickness of the turbulent layer to be detected makes it possible to prevent both of the two adjoining observation points from existing in the turbulent layer having the thickness that must be detected. This makes it possible to increase the probability in which two adjoining observation points can be disposed in the upper and lower layers sandwiching the turbulent layer having the thickness that must be detected.

The turbulent layer detecting section detects the horizontal wind velocity difference between the upper and lower layers of an atmospheric layer at respective portions of the atmospheric layer from the horizontal wind velocity at the observation points on a beam at each point in the process of scanning the direction of the beam, and detects the presence of a turbulent layer in each portion of the atmospheric layer from the magnitude of the horizontal wind velocity difference, or measures the density at the observation points on the beam at each point in the direction of the beam in the process of scanning the beam, and measures the change rate in density in each portion of the atmospheric layer so as to detect the presence of a turbulent layer in each portion of the atmospheric layer from the level of the measured change rate in density. Hence, as can be understood from the relationship between the Richardson number and the presence of a turbulent layer, the horizontal wind velocity difference and the change rate in density provide indexes in detecting a turbulent layer. Hence, the presence of a turbulent layer can be detected with high accuracy by measuring horizontal wind velocity difference and the change rate in density.

The turbulent layer detecting section has a predetermined threshold value on the horizontal wind velocity difference, and determines that a turbulent layer exists if a horizontal wind velocity difference exceeds the threshold value. This enables reliable detection of a turbulent layer having a horizontal wind velocity difference that is the predetermined threshold value or more.

The turbulent layer detecting section has a predetermined threshold value on the Richardson number, estimates a change rate in density from a known atmospheric density distribution, uses the estimated change rate in density and a measured horizontal wind velocity difference to calculate the Richardson number, and determines that a turbulent layer exists if the calculated Richardson number is smaller than the predetermined threshold value on the Richardson number. Thus, since the presence of a turbulent layer is detected on the basis of both the value of the horizontal wind velocity difference and the value of the change rate in density, the accuracy of the detection of a turbulent layer can be further improved.

The turbulent layer detecting section has a predetermined threshold value on the change rate in density, and determines that a turbulent layer exists if a measurement of the change rate in density in each portion of the atmospheric layer is smaller than the threshold value. This enables reliable detection of a turbulent layer having a density difference that is smaller than the predetermined threshold value.

The turbulent layer detecting section has a predetermined threshold value on the Richardson number, estimates a horizontal wind velocity difference from a known atmospheric wind velocity distribution, uses the estimated horizontal wind velocity difference and a measured change rate in density to calculate the Richardson number, and determines that a turbulent layer exists if the calculated Richardson number is smaller than the predetermined threshold value on the Richardson number. Thus, since the presence of a turbulent layer is detected on the basis of both the value of the horizontal wind velocity difference and the value of the change rate in density, the accuracy of the detection of a turbulent layer can be further improved.

The turbulent layer detecting section has a predetermined threshold value on the horizontal wind velocity difference and a predetermined threshold value on the change rate in density, and determines that a turbulent layer exists if at least one of the following conditions is satisfied, the conditions being such that the horizontal wind velocity difference at observation points located in the upper and lower layers of the atmospheric layer exceeds the predetermined threshold value on the horizontal wind velocity difference, and a measurement of the change rate in density at the observation points located in the upper and lower layers of the atmospheric layer is smaller than the predetermined threshold value on the change rate in density in each portion of the atmospheric layer. This makes it possible to reliably detect a turbulent layer having a horizontal wind velocity difference that is larger than the predetermined threshold value on the horizontal wind velocity difference or a density difference that is smaller than the predetermined threshold value on the density difference.

The turbulent layer detecting section has a predetermined threshold value on the Richardson number, uses a measurement of the horizontal wind velocity difference and a measurement of the change rate in density at the observation points located in the upper and lower layers of the atmospheric layer to calculate the Richardson number in each portion of an atmospheric layer, and determines that a turbulent layer exists if the calculated Richardson number is smaller than the predetermined threshold value on the Richardson number. Thus, based on both the value of the horizontal wind velocity difference and the value of the change rate in density, the presence of a turbulent layer is detected by using the Richardson number which is the value indicating the degree of turbulence of an atmospheric layer, permitting further improved accuracy of the detection of a turbulent layer.

The turbulent layer detecting section performs the detection of a turbulent layer by employing the measurement result of either the change rate in density or the horizontal wind velocity difference between the upper and lower layers sandwiching the atmospheric layer. If the turbulent layer detecting section determines that a turbulent layer has been detected, then it verifies the presence of the turbulent layer by employing the other measurement result. Hence, by using the measurement result of only one of the change rate in density and horizontal wind velocity difference to detect a turbulent layer, and by using the other measurement result to verify the presence of a turbulent layer if it is determined that the turbulent layer has been detected, the number of processing steps implemented on a received signal in the turbulent layer detecting apparatus can be reduced, making the apparatus less expensive accordingly, as compared with a case where the measurement of both change rate in density and horizontal wind velocity difference is always performed.

The transmitting section has a function for transmitting two or more beams of electromagnetic waves, sound waves, or light waves, and the receiving section receives electromagnetic waves, sound waves, or light waves, which are generated by being scattered by particulates or the like in the atmosphere, on each of the two or more beams. Thus, since the presence of a turbulent layer between the two observation points 4 can be detected from the measurement results of the wind velocities and the densities only at the two observation points 4, there is no need to perform measurement of wind velocity and density at any more points in the atmospheric layer 1, allowing a shortened time required for detection.

The wind velocity measuring section measures the beam direction components of the wind velocities at observation points on each of two or more beams, and the density measuring section measures the density at observation points on each of two or more beams. This arrangement makes it possible to measure the wind velocities and densities in the upper and lower layers sandwiching a turbulent layer rather than directly measuring the wind velocity in a turbulent layer. The wind velocity and the density in the upper and lower layers sandwiching the turbulent layer are stable in comparison with the wind velocity and the density in the turbulent layer. Hence, the error in measuring the wind velocity and the density can be reduced. This permits higher accuracy in the detection of a turbulent layer.

The wind velocity measuring section determines the horizontal wind velocity from the beam direction components of the wind velocities on the observation points on two or more beams. Hence, by using the horizontal wind velocity, the presence of a turbulent layer can be detected on the basis of a Richardson number.

The positions of at least two observation points among the respective observation points on two or more beams are the two locations in a direction perpendicular to the surface of the earth. Hence, since measurement is performed at the two locations in the direction perpendicular to the surface of the earth, the accuracy in detecting a turbulent layer can be improved.

The distance between the two locations in the direction perpendicular to the surface of the earth is greater than the thickness of a turbulent layer to be detected. Hence, setting the distance between the observation points to a greater value than the thickness of the turbulent layer to be detected makes it possible to prevent both of the two adjoining observation points from existing in the turbulent layer having the thickness that must be detected. This makes it possible to increase the probability in which two adjoining observation points can be disposed in the upper and lower layers sandwiching the turbulent layer having the thickness that must be detected.

The turbulent layer detecting section detects the horizontal wind velocity difference between the upper and lower layers of an atmospheric layer in respective portions of the atmospheric layer from the horizontal wind velocity at an observation point on each of two or more beams, and detects the presence of a turbulent layer in each portion of the atmospheric layer, or measures the density at an observation point on each of two or more beams, and measures the change rate in density in each portion of the atmospheric layer so as to detect the presence of a turbulent layer in each portion of the atmospheric layer from the level of the measured change rate in density. Therefore, as can be understood from the relationship between the Richardson number and the presence of a turbulent layer, the horizontal wind velocity difference and the change rate in density provide indexes in detecting a turbulent layer. Hence, the presence of a turbulent layer can be detected with high accuracy by measuring horizontal wind velocity difference and the change rate in density.

The turbulent layer detecting section has a predetermined threshold value on the horizontal wind velocity difference, and determines that a turbulent layer exists if a horizontal wind velocity difference exceeds the threshold value. This enables reliable detection of a turbulent layer having a horizontal wind velocity difference that is the predetermined threshold value or more.

The turbulent layer detecting section has a predetermined threshold value on the Richardson number, estimates a change rate in density from a known atmospheric density distribution, uses the estimated change rate in density and a measured horizontal wind velocity difference to calculate the Richardson number, and determines that a turbulent layer exists if the calculated Richardson number is smaller than the predetermined threshold value on the Richardson number. Thus, the presence of a turbulent layer is detected on the basis of both the value of the horizontal wind velocity difference and the value of the change rate in density, permitting further improved accuracy in the detection of a turbulent layer.

The turbulent layer detecting section has a predetermined threshold value on the change rate in density, and determines that a turbulent layer exists if a measurement of the change rate in density is smaller than the threshold value. This enables reliable detection of a turbulent layer having a density difference that is smaller than the predetermined threshold value.

The turbulent layer detecting section has a predetermined threshold value on the Richardson number, estimates a horizontal wind velocity difference from a known atmospheric wind velocity distribution, uses the estimated horizontal wind velocity difference and a measured change rate in density to calculate the Richardson number, and determines that a turbulent layer exists if the calculated Richardson number is smaller than the predetermined threshold value on the Richardson number. Thus, the presence of a turbulent layer is detected on the basis of both the value of the horizontal wind velocity difference and the value of the change rate in density, permitting further improved accuracy in the detection of a turbulent layer.

The turbulent layer detecting section has a predetermined threshold value on the horizontal wind velocity difference and a predetermined threshold value on the change rate in density, and determines that a turbulent layer exists if at least one of the following conditions is satisfied, the conditions being such that the horizontal wind velocity difference at observation points located in the upper and lower layers of the atmospheric layer exceeds the predetermined threshold value on the horizontal wind velocity difference, and a measurement of the change rate in density at the observation points located in the upper and lower layers of the atmospheric layer is smaller than the predetermined threshold value on the change rate in density in each portion of the atmospheric layer. This enables reliable detection of a turbulent layer having a horizontal wind velocity difference that is larger than the predetermined threshold value on the horizontal wind velocity difference or a density difference that is the predetermined value on the density difference or more.

The turbulent layer detecting section has a predetermined threshold value on the Richardson number, uses a measurement of the horizontal wind velocity difference and a measurement of the change rate in density at the observation points located in the upper and lower layers of the atmospheric layer to calculate the Richardson number in each portion of an atmospheric layer, and determines that a turbulent layer exists if the calculated Richardson number is smaller than the predetermined threshold value on the Richardson number. Thus, based on both the value of the horizontal wind velocity difference and the value of the change rate in density, the presence of a turbulent layer is detected by using the Richardson number which is the value indicating the degree of turbulence of an atmospheric layer, permitting further improved accuracy of the detection of a turbulent layer.

The turbulent layer detecting section performs the detection of a turbulent layer by employing the measurement result of either the change rate in density or the horizontal wind velocity difference between the upper and lower layers sandwiching the atmospheric layer. If the turbulent layer detecting section determines that a turbulent layer has been detected, then it verifies the presence of the turbulent layer by employing the other measurement result. Hence, by using the measurement result of only one of the change rate in density and horizontal wind velocity difference to detect a turbulent layer, and by using the other measurement result to verify the presence of a turbulent layer if it is determined that the turbulent layer has been detected, the number of processing steps implemented on a received signal in the turbulent layer detecting apparatus can be reduced, making the apparatus less expensive accordingly, as compared with a case where the measurement of both change rate in density and horizontal wind velocity difference is always performed.

The predetermined threshold value on the Richardson number is 0.25. This makes it possible to detect a turbulent layer wherein a vortex air turbulence exists that arises a problem especially in the operation of an aircraft.

What is claimed is:

1. A turbulent layer detecting apparatus comprising:
   a transmitting section that transmits beams of electromagnetic waves, sound waves or light waves into the atmosphere;
   a receiving section that receives the electromagnetic waves, the sound waves, or the light waves that have been transmitted by the transmitting section and scattered by particulates or the like in the atmosphere;
   one of a wind velocity measuring section that measures a beam direction component of a wind velocity at two or more observation points on the beam, and a density measuring section that measures a density at two or more observation points on the beam from a received signal received from the receiving section; and
   a turbulent layer detecting section that detects the presence of a turbulent layer on the basis of the output of either the wind velocity measuring section or the density measuring section.

2. A turbulent layer detecting apparatus according to claim 1,
   wherein the wind velocity measuring section determines the wind velocity in a horizontal direction from the beam direction component of a wind velocity.

3. A turbulent layer detecting apparatus according to claim 1,
   wherein the difference in altitude between two adjacent observation points of two or more observation points is greater than the thickness of a turbulent layer to be detected.

4. A turbulent layer detecting apparatus according to claim 2,
   wherein the turbulent layer detecting section detects a horizontal wind velocity difference from the horizontal wind velocities at two adjoining observation points of two or more observation points on the beam so as to detect a turbulent layer from the magnitude of the horizontal wind velocity difference,
   or measures the densities at two adjoining observation points at two or more observation points on the beam and measures the change rate in the density at the altitudes of the two adjoining observation points so as to detect a turbulent layer from the magnitude of the change rate in the density.

5. A turbulent layer detecting apparatus according to claim 4,
   wherein the turbulent layer detecting section has a predetermined threshold value on the horizontal wind velocity difference, and determines that a turbulent layer exists if a horizontal wind velocity difference exceeds the threshold value.

6. A turbulent layer detecting apparatus according to claim 4,
   wherein the turbulent layer detecting section has a predetermined threshold value on the Richardson number, estimates a change rate in density from a known atmospheric density distribution, uses the estimated change rate in density and a measured horizontal wind velocity difference to calculate the Richardson number, and determines that a turbulent layer exists if the calculated Richardson number is smaller than the predetermined threshold value on the Richardson number.

7. A turbulent layer detecting apparatus according to claim 4,
   wherein the turbulent layer detecting section has a predetermined threshold value on the change rate in density, and determines that a turbulent layer exists if a measurement of the change rate in density is smaller than the threshold value.

8. A turbulent layer detecting apparatus according to claim 4,
   wherein the turbulent layer detecting section has a predetermined threshold value on the Richardson number, estimates a horizontal wind velocity difference from a known atmospheric wind velocity distribution, uses the estimated horizontal wind velocity difference and a measured change rate in density to calculate the Richardson number, and determines that a turbulent layer exists if the Richardson number is smaller than the predetermined threshold value on the Richardson number.

9. A turbulent layer detecting apparatus according to claim 4, wherein the turbulent layer detecting section has a predetermined threshold value on the horizontal wind velocity difference and a predetermined threshold value on the change rate in density, and determines that a turbulent layer exists if at least one of the following conditions is satisfied, the conditions being such that a measurement of the horizontal wind velocity difference exceeds the predetermined threshold value on the horizontal wind velocity difference, and a measurement of the change rate in density is smaller than the predetermined threshold value on the change rate in density.

10. A turbulent layer detecting apparatus according to claim 4, wherein the turbulent layer detecting section has a predetermined threshold value on the Richardson number, uses a measurement of the horizontal wind velocity difference and a measurement of the change rate in density to calculate the Richardson number, and determines that a turbulent layer exists if the Richardson number is smaller than the predetermined threshold value on the Richardson number.

11. A turbulent layer detecting apparatus according to claim 4, wherein the turbulent layer detecting section uses a measurement result of either the change rate in density or the horizontal wind velocity difference to detect a turbulent layer, and if it determines that a turbulent layer has been detected, then it verifies the presence of the turbulent layer by employing the other measurement result.

12. A turbulent layer detecting apparatus according to claim 1, wherein the transmitting section causes the direction of the beam to be sequentially scanned in the atmosphere, and the receiving section receives the scanned beam that has been scattered by particulates or the like in the atmosphere.

13. A turbulent layer detecting apparatus according to claim 12, wherein the wind velocity measuring section measures a beam direction component of a wind velocity at two or more observation points on the beam, and the density measuring section measures the density at two or more observation points on the beam at each point in the process of scanning the direction of the beam.

14. A turbulent layer detecting apparatus according to claim 1, wherein the transmitting section has a function for transmitting two or more beams of electromagnetic waves, sound waves, or light waves, and the receiving section receives electromagnetic waves, sound waves, or light waves, which are generated by being scattered by particulates or the like in the atmosphere, on each of the two or more beams.

15. A turbulent layer detecting apparatus according to claim 14, wherein the wind velocity measuring section measures the beam direction component of a wind velocity at observation points on each of two or more beams, and the density measuring section measures the density at observation points on each of two or more beams.

16. A turbulent layer detecting apparatus according to claim 15, wherein the wind velocity measuring section determines the horizontal wind velocity from the beam direction components of the wind velocities on the observation points on two or more beams.

17. A turbulent layer detecting apparatus according to claim 16, wherein the turbulent layer detecting section detects the horizontal wind velocity difference between upper and lower layers of an atmospheric layer in each portion of an atmospheric layer from the horizontal wind velocities at the observation points on the two or more beams, and detects the presence of a turbulent layer in each portion of the atmospheric layer from the magnitude of the horizontal wind velocity difference, or measures the density at the observation point on each of the two or more beams, measures the change rate in density in each portion of an atmospheric layer, and detects the presence of a turbulent layer in each portion of the atmospheric layer from the magnitude of the change rate in density.

18. A turbulent layer detecting apparatus according to claim 17, wherein the turbulent layer detection section has a predetermined threshold value on horizontal wind velocity difference, and determines that a turbulent layer exists if the horizontal wind velocity difference exceeds the threshold value.

19. A turbulent layer detecting apparatus according to claim 17, wherein the turbulent layer detecting section performs the detection of a turbulent layer by employing the measurement result of either the change rate in density or the horizontal wind velocity difference between the upper and lower layers sandwiching an atmospheric layer, and verifies the presence of a turbulent layer by employing the other measurement result if it determines that it has detected a turbulent layer.

20. A turbulent layer detecting apparatus according to claim 6, wherein the predetermined threshold value on the Richardson number is 0.25.

* * * * *